(12) United States Patent
Brady et al.

(10) Patent No.: US 9,512,985 B2
(45) Date of Patent: Dec. 6, 2016

(54) SYSTEMS FOR PROVIDING ILLUMINATION IN OPTICAL METROLOGY

(71) Applicant: KLA-Tencor Corporation, Milpitas, CA (US)

(72) Inventors: Gregory R. Brady, San Jose, CA (US); Andrei V. Shchegrov, Campbell, CA (US); Lawrence D. Rotter, Pleasanton, CA (US); Derrick Shaughnessy, San Jose, CA (US); Anatoly Shchemelinin, Pleasanton, CA (US); Ilya Bezel, Sunnyvale, CA (US); Muzammil A. Arain, Milpitas, CA (US); Anatoly A. Vasiliev, Sunnyvale, CA (US); James Andrew Allen, Elk Grove, CA (US); Oleg Shulepov, San Jose, CA (US); Andrew V. Hill, Sunnyvale, CA (US); Ohad Bachar, Timrat (IL); Moshe Markowitz, Haifa (IL); Yaron Ish-Shalom, Kyryat Tivon (IL); Ilan Sela, Haifa (IL); Amnon Manassen, Haifa (IL); Alexander Svizher, Haifa (IL); Maxim Khokhlov, Haifa (IL); Avi Abramov, Haifa (IL); Oleg Tsibulevsky, Migdal Haemeq (IL); Daniel Kandel, Aseret (IL); Mark Ghinovker, Yoqneam Ilit (IL)

(73) Assignee: KLA-Tencor Corporation, Milpitas, CA (US)

( * ) Notice: Subject to any disclaimer, the term of this patent is extended or adjusted under 35 U.S.C. 154(b) by 453 days.

(21) Appl. No.: 13/774,025

(22) Filed: Feb. 22, 2013

(65) Prior Publication Data
US 2014/0240951 A1 Aug. 28, 2014

(51) Int. Cl.
*F21S 8/10* (2006.01)
*F21V 13/08* (2006.01)
(Continued)

(52) U.S. Cl.
CPC ............... *F21V 13/08* (2013.01); *F21V 13/00* (2013.01); *F21V 13/12* (2013.01); *G02B 6/29332* (2013.01); *G02B 6/29362* (2013.01); *G02B 6/353* (2013.01); *G02B 6/3508* (2013.01)

(58) Field of Classification Search
CPC .............. G02B 6/0008; G02B 27/141; F21Y 2101/025; A61B 1/07; A61B 1/0684; A61B 1/0669; A61B 1/063; A61B 1/0653; A61B 1/0638; A61B 18/22; A61B 1/00167; A61B 1/043; A61B 1/00096; A61B 2018/2222
USPC .................................................. 362/551–582
See application file for complete search history.

(56) References Cited

U.S. PATENT DOCUMENTS 5,109,447 A 4/1992 Chan
6,297,880 B1 10/2001 Rosencwaig et al.
(Continued)

FOREIGN PATENT DOCUMENTS

EP 0196948 A1 10/1986
JP 2009253129 A 10/2009

OTHER PUBLICATIONS

EP Supplementary Search Report for Application No. EP 14753960.5 dated Sep. 28, 2016, 8 pages.

*Primary Examiner* — William Carter
(74) *Attorney, Agent, or Firm* — Suiter Swantz pc llo

(57) ABSTRACT

The disclosure is directed to systems for providing illumination to a measurement head for optical metrology. In some embodiments of the disclosure, illumination beams from a plurality of illumination sources are combined to deliver illumination at one or more selected wavelengths to the measurement head. In some embodiments of the disclosure, intensity and/or spatial coherence of illumination delivered to the measurement head is controlled. In some embodiments of the disclosure, illumination at one or more selected wavelengths is delivered from a broadband illumination source configured for providing illumination at a continuous range of wavelengths.

50 Claims, 12 Drawing Sheets

(51) Int. Cl.
  *F21V 13/00*  (2006.01)
  *F21V 13/12*  (2006.01)
  *G02B 6/35*   (2006.01)
  *G02B 6/293*  (2006.01)

(56) References Cited

U.S. PATENT DOCUMENTS

| | | |
|---|---|---|
| 6,429,943 B1 | 8/2002 | Opsal et al. |
| 6,654,131 B2 | 11/2003 | Opsal et al. |
| 6,766,084 B1 | 7/2004 | Campbell |
| 7,435,982 B2 | 10/2008 | Smith |
| 7,567,351 B2 | 7/2009 | Opsal et al. |
| 7,786,455 B2 | 8/2010 | Smith |
| 7,989,786 B2 | 8/2011 | Smith et al. |
| 2004/0109225 A1 | 6/2004 | Hu et al. |
| 2005/0078905 A1* | 4/2005 | Kakui .............. H04B 10/294 385/14 |
| 2007/0166965 A1 | 7/2007 | Tanaka et al. |
| 2009/0095890 A1* | 4/2009 | Tanaka .............. G02F 1/365 362/231 |
| 2010/0302521 A1 | 12/2010 | Kuiper |
| 2011/0026032 A1 | 2/2011 | Den Boef et al. |
| 2011/0069312 A1 | 3/2011 | Kandel et al. |
| 2011/0182305 A1 | 7/2011 | Daiber et al. |
| 2011/0310388 A1* | 12/2011 | Hill .............. G01N 21/474 356/369 |
| 2013/0169966 A1 | 7/2013 | Shchegrov et al. |

* cited by examiner

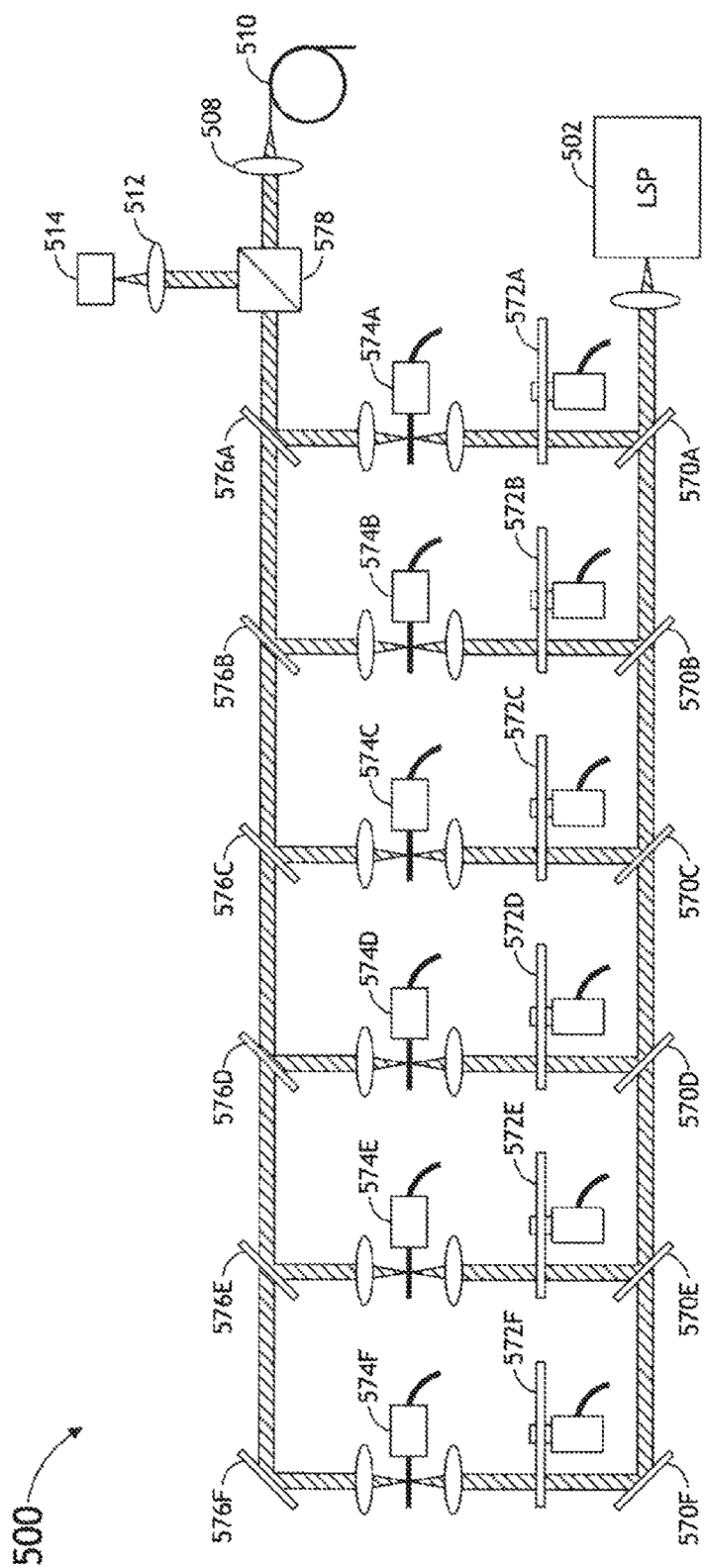

US 9,512,985 B2

SYSTEMS FOR PROVIDING ILLUMINATION IN OPTICAL METROLOGY

TECHNICAL FIELD

The present disclosure generally relates to the field of optical metrology and more particularly to systems for providing illumination for optical metrology.

BACKGROUND

Optical metrology systems based on scatterometry techniques are often utilized to characterize critical device layers in semiconductors. Examples of optical metrology systems include, but are not limited to, one dimensional beam profile reflectometry (1D-BPR), two dimensional beam profile reflectometry (2D-BPR), spectroscopic reflectometry, and spectroscopic ellipsometry systems. The foregoing optical metrology systems and others known to the art illuminate samples to perform measurements. Various illumination systems are currently employed to provide illumination to a measurement head of an optical metrology system.

Several currently employed illumination systems suffer from structural or performance deficiencies. Some current systems are not compact and require a large number of optical surfaces to guide or manage illumination delivered to the measurement head. Some current systems are limited to one or more specific laser wavelengths or are unable to provide illumination in certain wavelength ranges to the measurement head. Some current systems are very susceptible to noise, such that even small amounts of noise in voltage driving an electro-optical modulator, such as a Pockets cell, can result in unacceptable amounts of noise affecting intensity of illumination delivered to the measurement head. Some current systems lack stability in coupling from free space to an optical fiber, thus resulting in large amounts of noise affecting intensity of illumination delivered to the measurement head. Some current systems are susceptible to laser speckle from high degrees of spatial coherence produced by a laser point source and/or single-mode optical fiber. The foregoing examples illustrate deficiencies in some of the illumination systems currently known to the art.

SUMMARY

The present disclosure is directed to systems for providing illumination to at least one measurement head of an optical metrology system.

An embodiment of the disclosure includes a system for providing illumination to a measurement head. The system may include a plurality of illumination sources including, but not limited to, a first illumination source, a second illumination source, a third illumination source, a fourth illumination source, a fifth illumination source, and a sixth illumination source. A first fold mirror may be configured to reflect illumination from the first illumination source along a guidance path. A second fold mirror may be configured to reflect illumination from the second illumination source along the guidance path. A first dichroic combiner may be configured to transmit illumination from the first illumination source along the guidance path. The first dichroic combiner may be further configured to reflect illumination from the third illumination source along the guidance path. A second dichroic combiner may be configured to transmit illumination from the second illumination source along the guidance path. The second dichroic combiner may be further configured to reflect illumination from the fourth illumination source along the guidance path. A third dichroic combiner may be configured to transmit illumination from the first illumination source and illumination from the third illumination source along the guidance path. The third dichroic combiner may be further configured to reflect illumination from the fifth illumination source along the guidance path. A fourth dichroic combiner may be configured to transmit illumination from the sixth illumination source along the guidance path. The fourth dichroic combiner may be further configured to reflect illumination from the second illumination source and illumination from the fourth illumination source along the guidance path. A fifth dichroic combiner may be configured to transmit illumination from the second illumination source, illumination from the fourth illumination source, and illumination from the sixth illumination source along an illumination path to the measurement head. The fifth dichroic combiner may be further configured to reflect illumination from the first illumination source, illumination from the third illumination source, and illumination from the fifth illumination source along the illumination path to the measurement head.

Another embodiment of the disclosure includes a system for providing illumination to a measurement head. The system may include a plurality of illumination sources including, but not limited to, a first illumination source, a second illumination source, a third illumination source, a fourth illumination source, a fifth illumination source, and a sixth illumination source. A first dichroic combiner may be configured to transmit illumination from the first illumination source along a guidance path. The first dichroic combiner may be further configured to reflect illumination from the second illumination source along the guidance path. A second dichroic combiner may be configured to transmit illumination from the third illumination source along the guidance path. The second dichroic combiner may be further configured to reflect illumination from the first illumination source and illumination from the second illumination source along the guidance path. A third dichroic combiner may be configured to transmit illumination from the fourth illumination source along the guidance path. The third dichroic combiner may be further configured to reflect illumination from the fifth illumination source along the guidance path. A fourth dichroic combiner may be configured to transmit illumination from the fourth illumination source and illumination from the fifth illumination source along an illumination path to the measurement head. The fourth dichroic combiner may be further configured to reflect illumination from the first illumination source, illumination from the second illumination source, and illumination from the third illumination source along the illumination path to the measurement head. A beam splitter may be configured to direct illumination from the sixth illumination source along the illumination path to the measurement head.

Another embodiment of the disclosure includes a system for providing illumination to a measurement head. The system may include a plurality of illumination sources configured to provide illumination at a plurality of wavelengths along a plurality of optical fibers. Each optical fiber may be configured to receive illumination at a different wavelength. A coupling lens may be configured to receive illumination at a selected wavelength from a selected optical fiber of the plurality of optical fibers. The coupling lens may be further configured to direct illumination at the selected wavelength along a delivery optical fiber. A ferrule may be configured to hold the plurality of optical fibers. An actuator may be mechanically coupled to the ferrule, the coupling lens, and/or the delivery fiber. The actuator may be configured to align the selected optical fiber of the ferrule with the coupling lens and/or the delivery fiber. A collimation lens may be configured to receive illumination at the selected wavelength from the delivery optical fiber. The collimation lens may be further configured to direct illumination at the selected wavelength along an illumination path to the measurement head.

Another embodiment of the disclosure includes a system for providing illumination to a measurement head. The system may include a plurality of illumination sources configured to provide illumination at a plurality of wavelengths along a plurality of optical fibers. Each optical fiber may be configured to receive illumination at a different wavelength. A waveguide structure may be configured to direct illumination from the plurality of optical fibers along an illumination path to the measurement head. A plurality of shutters and/or waveguide modulators disposed between the plurality of illumination sources and optical paths of the waveguide structure may be configured to allow illumination at a selected wavelength to be delivered along the illumination path.

Another embodiment of the disclosure includes a system for providing illumination to a measurement head utilizing a laser sustained plasma source. One or more multi-mode optical fibers may be configured to deliver illumination from the laser sustained plasma source along an illumination path to the measurement head. A filter mechanism may be disposed between the laser sustained plasma source and the one or more multi-mode optical fibers to allow illumination at a selected wavelength to be delivered along the illumination path.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 5G is a block diagram illustrating an illumination system for providing illumination to a measurement head, in accordance with an embodiment of this disclosure.

DETAILED DESCRIPTION

Reference will now be made in detail to the subject matter disclosed, which is illustrated in the accompanying drawings.

FIGS. 1 through 5F generally illustrate systems for providing illumination to a measurement head of an optical metrology system. The optical metrology system may include, but is not limited to, a one dimensional beam profile reflectometry (1D-BPR), two dimensional beam profile reflectometry (2D-BPR), spectroscopic reflectometry, spectroscopic ellipsometry, angle-resolved reflectometry or scatterometry system, or any metrology system discussed in U.S. Pat. Nos. 6,429,943, 6,654,131, 6,297,880, 7,567,351, U.S. Publication Nos. 2011/0310388, 2011/0069312, and U.S. Pat. App. Ser. No. 61/545,965, all incorporated herein by reference.

In some embodiments of the disclosure, illumination beams from a plurality of illumination sources are combined to deliver illumination at one or more selected wavelengths to the measurement head. In some embodiments of the disclosure, intensity and/or spatial coherence of illumination delivered to the measurement head is controlled. In some embodiments of the disclosure, illumination at one or more selected wavelengths is delivered from a broadband illumination source configured for providing illumination at a continuous range of wavelengths. Systems or methods for accomplishing some or all of the foregoing functions, among others, are described in the embodiments that follow.

Figure 1:
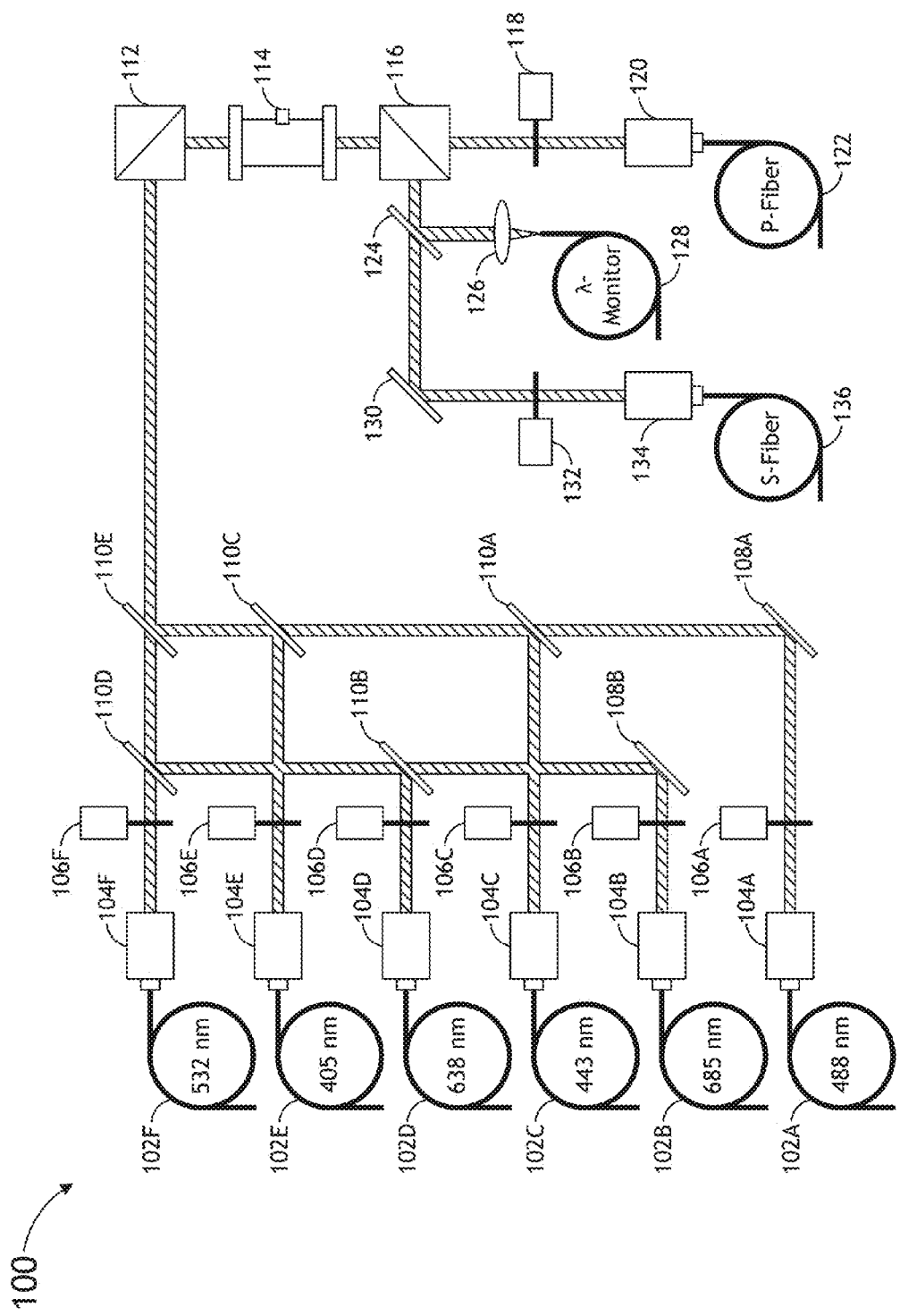
FIG. 1 is a block diagram illustrating an illumination system for providing illumination to a measurement head, in accordance with an embodiment of this disclosure.

FIG. 1 illustrates an embodiment of a system 100 for providing illumination to a measurement head of an optical metrology system utilizing a plurality of illumination sources 102. Illumination emanating from the illumination sources 102 may be combined to propagate along a common illumination path utilizing a plurality of dichroic combiners 110. In an embodiment, the dichroic combiners 110 are configured to direct illumination along a free space illumination path. In some embodiments, at least a portion of the illumination path may be delineated by one or more optical elements, such as focusing lenses, beam splitters, combiners, mirrors, coupling lenses, optical fibers, attenuators, polarizers, collimation lenses, and the like.

In an embodiment, the system 100 includes, but is not limited to, a first illumination source 102A, a second illumination source 102B, a third illumination source 102C, a fourth illumination source 102D, a fifth illumination source 102E, and a sixth illumination source 102F. Each illumination source 102 may be configured to provide illumination at a selected wavelength or a selected range of wavelengths. In an exemplary embodiment, the first illumination source 102A, second illumination source 102B, third illumination source 102C, fourth illumination source 102D, fifth illumination source 102E, and sixth illumination source 102F may be configured to provide illumination at 488 nm, 685 nm, 443 nm, 638 nm, 405 nm, and 532 nm wavelengths, respectively. It is noted herein that the foregoing exemplary embodiment is included for illustrative purposes and should not be construed as a limitation on the present disclosure. In other embodiments, illumination sources 102 configured to provide illumination at an alternative set of wavelengths may be selected.

The illumination sources 102 may be configured to transmit illumination through respective collimation lenses 104 to a guide path delineated by optical elements, including but not limited to, fold mirrors 108 and dichroic combiners 110. The system 100 may further include shutters 106 disposed between the illumination sources 102 and the guide path. The shutters 106 may be configured to allow illumination from at least one selected illumination source 102 to be transmitted to the guide path while blocking illumination from other illumination sources 102. In an embodiment, a shutter 106 corresponding to an illumination source 102 emanating illumination at a selected wavelength may open to let through illumination at the selected wavelength while all other shutters 106 remain closed to block illumination at other wavelengths emanating from the other illumination sources 102.

In an embodiment, the guide path may include, but is not limited to, two fold mirrors and five dichroic combiners in the compact arrangement illustrated in FIG. 1 and described herein. A first fold mirror 108A may be configured to reflect illumination from the first illumination source 102A towards a first dichroic combiner 110A. A second fold mirror 108B may be configured to reflect illumination from the second illumination source 102B towards a second dichroic combiner 110B.

A dichroic combiner 110 may be configured to transmit illumination at wavelengths above or below a selected threshold while reflecting illumination at other wavelengths. Alternatively, a dichroic combiner 110 may be configured to transmit illumination at wavelengths within or outside of a selected range while reflecting illumination at other wavelengths. The first dichroic combiner 110A may be configured to transmit illumination from the first illumination source 102A towards a third dichroic combiner 110C. The first dichroic combiner 110A may be further configured to reflect illumination from the third illumination source 102C towards the third dichroic combiner 110C.

The second dichroic combiner 110B may be configured to transmit illumination from the second illumination source 102B towards a fourth dichroic combiner 110D. The second dichroic combiner 110B may be further configured to reflect illumination from the fourth illumination source 102D towards the fourth dichroic combiner 110D.

The third dichroic combiner 110C may be configured to transmit illumination from the first illumination source 102A and illumination from the third illumination source 102C towards a fifth dichroic combiner 110E. The third dichroic combiner 110C may be further configured to reflect illumination from the fifth illumination source 102E towards the fifth dichroic combiner 110E.

The fourth dichroic combiner 110D may be configured to transmit illumination from the sixth illumination source 102F towards the fifth dichroic combiner 110E. The fourth dichroic combiner 110D may be further configured to reflect illumination from the second illumination source 102B and illumination from the fourth illumination source 102D towards the fifth dichroic combiner 110E.

The fifth dichroic combiner 110E may be configured to transmit illumination from the second illumination source 102B, illumination from the fourth illumination source 102D, and illumination from the sixth illumination source 102F along the illumination path to the measurement head of the optical metrology system. The fifth dichroic combiner 110E may be further configured to reflect illumination from the first illumination source 102A, illumination from the third illumination source 102C, and illumination from the fifth illumination source 102E along the illumination path to the measurement head.

In an embodiment, the illumination path may include one or more polarizing beam splitters 112, 116 disposed before and/or after an intensity control module 114. The intensity control module may include an electro-optical device, such as a Pockel's cell, configured to attenuate intensity of illumination delivered along the illumination path to the measurement head. At least one polarizing beam splitter 116 may be configured to direct a portion of illumination along a delivery path to a single-mode or multi-mode optical fiber 122 configured to deliver the portion of illumination to a polarization channel of the measurement head. The polarizing beam splitter 116 may be further configured to direct at least one additional portion of illumination along an additional delivery path to an optical fiber 136 configured to deliver the additional portion of illumination to an additional polarization channel of the measurement head. The delivery paths may include additional optical elements to define a path and/or control illumination propagating along the path. For example, a fold mirror 130 may be configured to reflect illumination along a selected path. Shutters 118, 132 may be configured to selectively transmit or block illumination delivered to the optical fibers 122, 136. Coupling lenses 120, 134 may be configured to transfer illumination from free space to the optical fibers 122, 136. A beam splitter 124 may be configured to direct a small portion of illumination from the illumination path or delivery path to a wavelength monitor 128 through a lens 126, optical fiber, and/or any other optical elements. The foregoing examples are provided for illustrative purposes only. It is contemplated that various optical elements may be included or excluded without departing from the essence of the present disclosure.

Figure 2:
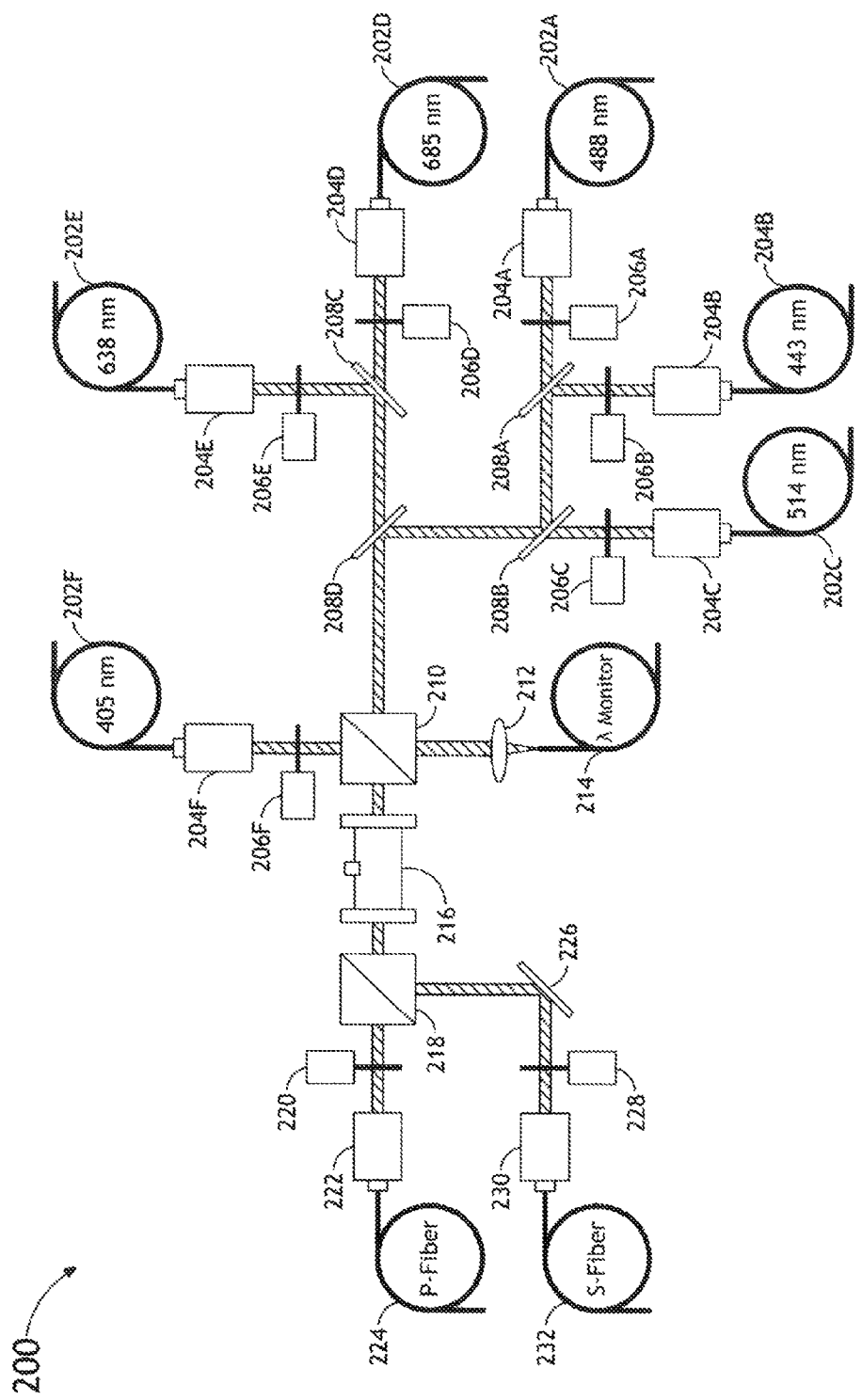
FIG. 2 is a block diagram illustrating an illumination system for providing illumination to a measurement head, in accordance with an embodiment of this disclosure.

Another embodiment of a system 200 for providing illumination to a measurement head of an optical metrology system utilizing a plurality of illumination sources 202 is illustrated in FIG. 2. In an embodiment, the system 200 includes, but is not limited to, a first illumination source 202A, a second illumination source 202B, a third illumination source 202C, a fourth illumination source 202D, a fifth illumination source 202E, and a sixth illumination source 202F.

In an exemplary embodiment, the first illumination source 202A, second illumination source 202B, third illumination source 202C, fourth illumination source 202D, fifth illumination source 202E, and sixth illumination source 202F may be configured to provide illumination at 488 nm, 443 nm, 514 nm, 685 nm, 638 nm, and 405 nm wavelengths, respectively. In another exemplary embodiment, the first illumination source 202A, second illumination source 202B, third illumination source 202C, fourth illumination source 202D, fifth illumination source 202E, and sixth illumination source 202F may be configured to provide illumination at 443 nm, 405 nm, 488 nm, 638 nm, 532 nm, and 685 nm wavelengths, respectively. It is noted herein that the foregoing exemplary embodiments are included for illustrative purposes and should not be construed as limitations on the present disclosure. In other embodiments, illumination sources 202 configured to provide illumination at an alternative set of wavelengths may be selected.

The illumination sources 202 may be configured to transmit illumination through respective collimation lenses 204 to a guide path. Shutters 206 disposed between the illumination sources 202 and the guide path may be configured to allow illumination from at least one selected illumination source 202 to be transmitted to the guide path while blocking illumination from other illumination sources 202.

In an embodiment, the guide path may include, but is not limited to, four dichroic combiners 208 configured to combine illumination beams from the plurality of illumination sources 202 along a common illumination path. A first dichroic combiner 208A may be configured to transmit illumination from the first illumination source 202A towards a second dichroic combiner 208B. The first dichroic combiner 208A may be further configured to reflect illumination from the second illumination source 202B towards the second dichroic combiner 208B.

A second dichroic combiner 208B may be configured to transmit illumination from the third illumination source 202C towards a fourth dichroic combiner 208D. The second dichroic combiner 208B may be further configured to reflect illumination from the first illumination source 202A and illumination from the second illumination source 202B towards the fourth dichroic combiner 208D.

A third dichroic combiner 208C may be configured to transmit illumination from the fourth illumination source 202D towards the fourth dichroic combiner 208D. The third dichroic combiner 208C may be further configured to reflect illumination from the fifth illumination source 202E towards the fourth dichroic combiner 208D.

The fourth dichroic combiner 208D may be configured to transmit illumination from the fourth illumination source 202D and illumination from the fifth illumination source 202E along the illumination path to the measurement head. The fourth dichroic combiner 208D may be further configured to reflect illumination from the first illumination source 202A, illumination from the second illumination source 202B, and illumination from the third illumination source 202C along the illumination path to the measurement head.

In an embodiment, the illumination path may include one or more polarizing beam splitters 210, 218 disposed before and/or after an intensity control module 216. At least one polarizing beam splitter 210 may be configured to direct illumination from the sixth illumination source 202F along the illumination path to the measurement head. In an embodiment, the polarizing beam splitter 210 or another beam splitter may be configured to direct a portion of illumination from the illumination path or a delivery path to a wavelength monitor 214 through a lens 212, optical fiber, and/or any other optical elements. At least one polarizing beam splitter 218 may be configured to direct one or more portions of illumination along one or more delivery paths to single-mode or multi-mode optical fibers 224, 232 configured to deliver illumination to polarization channels of the measurement head. The delivery paths may include additional optical elements such as, but not limited to, fold mirrors 226, shutters 220, 228, and coupling lenses 222, 230 as previously discussed with regards to system 100.

Figure 3:
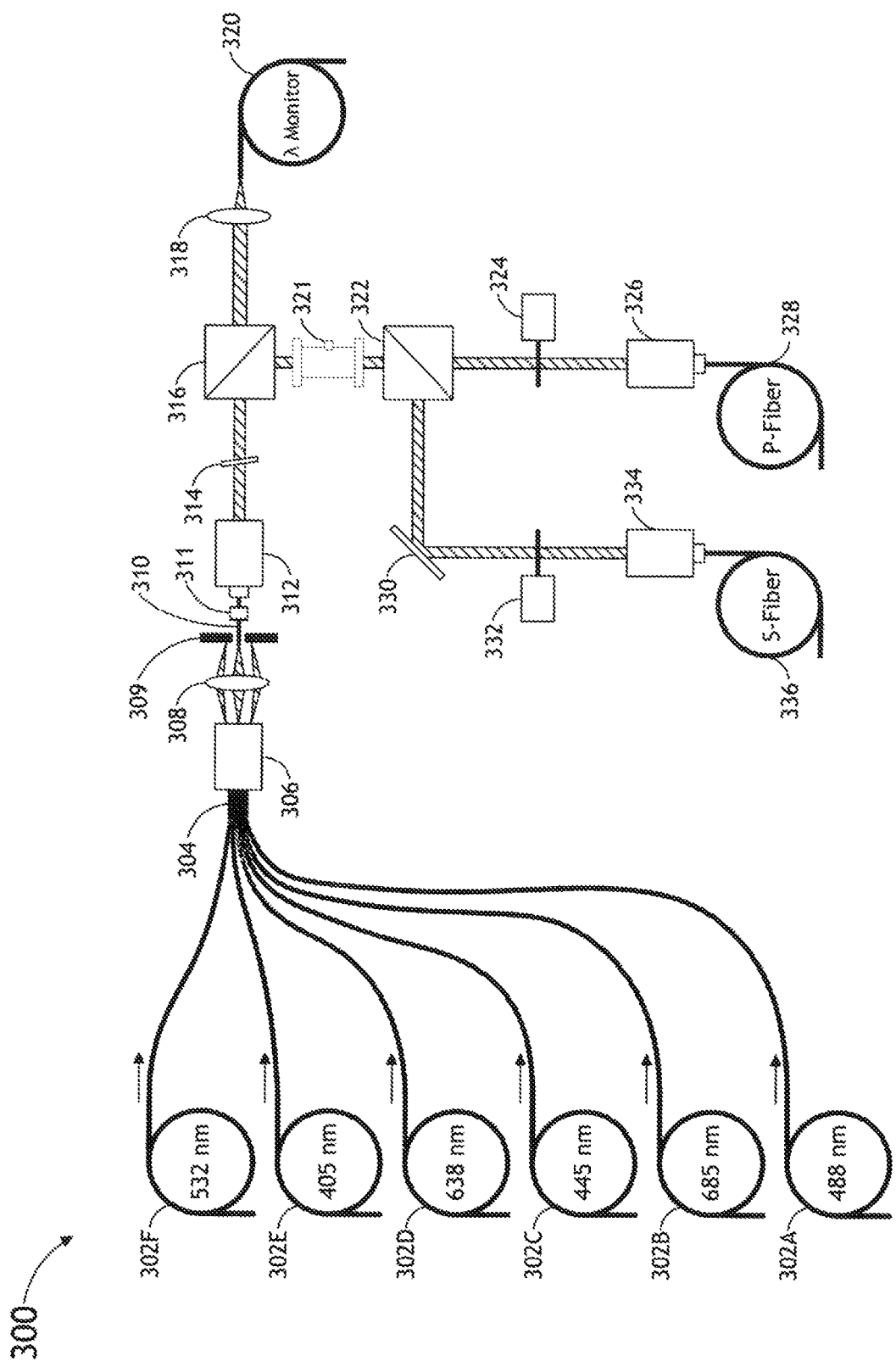
FIG. 3 is a block diagram illustrating an illumination system for providing illumination to a measurement head, in accordance with an embodiment of this disclosure.

FIG. 3 illustrates another embodiment of a system 300 for providing illumination to a measurement head of an optical metrology system utilizing a plurality of illumination sources 302. Each illumination source 302 may be configured to transmit illumination at a selected wavelength along a corresponding optical fiber. The system may include an actuator 306, such as a piezoelectric actuator or motion control device employing one or more motors or servos. The actuator 306 may be configured to align a selected optical fiber transmitting illumination at a selected wavelength with a coupling lens 308. The coupling lens 308 may be configured to transmit illumination from the selected optical fiber through free space or along a delivery optical fiber 310 to a collimation lens 312. The collimation lens 312 may be configured to transmit collimated illumination of the selected optical fiber along the illumination path to the measurement head.

In an embodiment, the actuator 306 may be configured to actuate the coupling lens 308 to achieve alignment with the selected optical fiber. For example, the coupling lens 308 may be translated or rotated to alignment with a collimated beam from the selected optical fiber. In some embodiments, it may be advantageous to actuate the coupling lens 308 in a translating or rotating fashion for faster switching.

In another embodiment, illustrated in FIG. 3, the actuator 306 may be configured to actuate a ferrule 304 holding the optical fibers to align the selected optical fiber with the coupling lens 308. In an exemplary embodiment, the ferrule 304 includes a hexagonal array configured for holding six optical fibers corresponding to a first illumination source 302A, a second illumination source 302B, a third illumination source 302C, a fourth illumination source 302D, a fifth illumination source 302E, and a sixth illumination source 302F. In some embodiments, it is advantageous to pack the optical fibers in the ferrule 304 with minimal space between the optical fibers.

In an embodiment, the actuator 306 may be configured to move the ferrule 304 laterally (i.e. XY positioning) to align the selected optical fiber with the coupling lens 308. When the selected fiber is aligned with the coupling lens 308, illumination at the selected wavelength may be directed through an aperture of a beam dump 309 while illumination at other wavelengths is blocked by the beam dump 309. The actuator 306 may be further configured to move the ferrule 304 or the coupling lens 308 longitudinally (i.e. Z positioning) to focus the illumination delivered from the selected optical fiber. In some embodiments, the actuator 306 may be configured to control intensity of illumination delivered to the measurement head by adjusting the level of focus. In another embodiment, a variable fiber attenuator 311 may be configured to control intensity of illumination delivered to the measurement head. In some embodiments, a free space intensity control module 321 may be configured to control intensity of illumination delivered to the measurement head.

In another embodiment, the actuator 306 may be configured to actuate the delivery optical fiber 310 to align the delivery optical fiber 310 with illumination delivered to the coupling lens 308 from the selected optical fiber. In some embodiments, the beam dump 309 may be coupled to the tip of the delivery optical fiber 310. The beam dump 309 may be configured to allow illumination at the selected wavelength through the delivery optical fiber 310 while blocking illumination at other wavelengths when the delivery optical fiber 310 is aligned with illumination transferred through the coupling lens 308 from the selected optical fiber. It is further contemplated that, in any of the embodiments described herein, the beam dump 309 may be disposed before the delivery optical fiber 310 in a fixed or dynamic arrangement to mitigate interference from illumination at wavelengths other than the selected wavelength.

In an embodiment, the illumination path may include at least one polarizing beam splitter 322 configured to direct one or more portions of illumination along one or more delivery paths to single-mode or multi-mode optical fibers 328, 336 configured to deliver illumination to polarization channels of the measurement head. The delivery paths may include additional optical elements such as, but not limited to, fold mirrors 330, shutters 324, 332, and coupling lenses 326, 334 as previously discussed with regards to system 100. In an embodiment, the illumination path may further include at least one wave plate 314 and/or any other optical elements.

In another embodiment, illumination and delivery paths may be combined by including a bifurcated optical fiber (e.g. S a P fiber) coupled to the beam dump 309. In an embodiment, the bifurcated optical fiber may also replace the collimation lens 312 and the polarizing beam splitter 322. The bifurcated optical fiber may be configured to transmit illumination at the selected wavelength to the polarization channels of the measurement head. Polarization distinction may be achieved by rotating one fiber polarization key 90 degrees with respect to another polarization key at either end.

A polarizing beam splitter 316 or another beam splitter may be configured to direct a portion of illumination from the illumination path or a delivery path to a wavelength monitor 320 through a lens 318, optical fiber, and/or any other optical elements. In an embodiment, the wavelength monitor 320 may be configured to receive illumination from a beam splitter disposed along the delivery path prior to the measurement head.

Figure 4A:
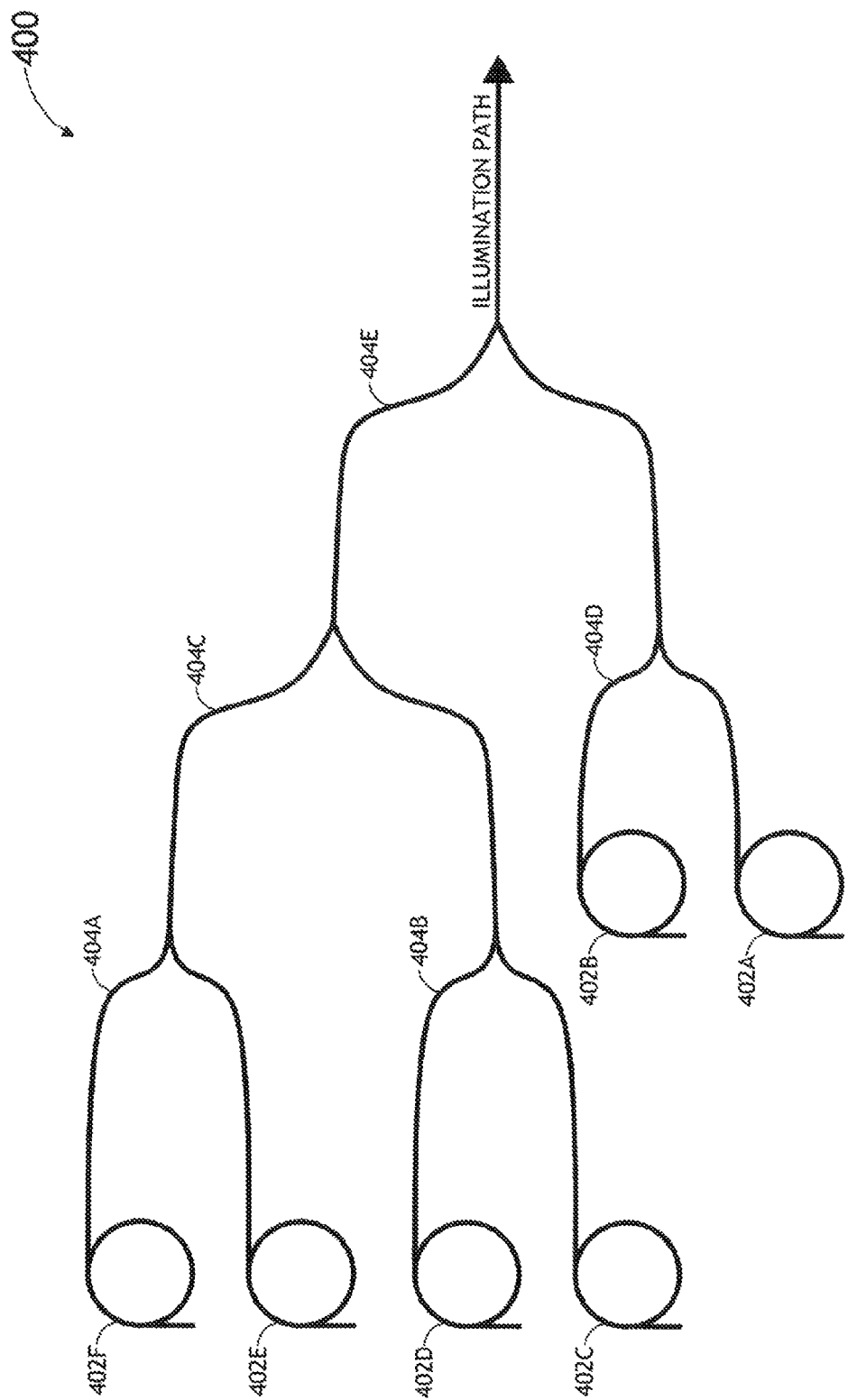
FIG. 4A is a block diagram illustrating an illumination system for providing illumination to a measurement head, in accordance with an embodiment of this disclosure.
Figure 4B:
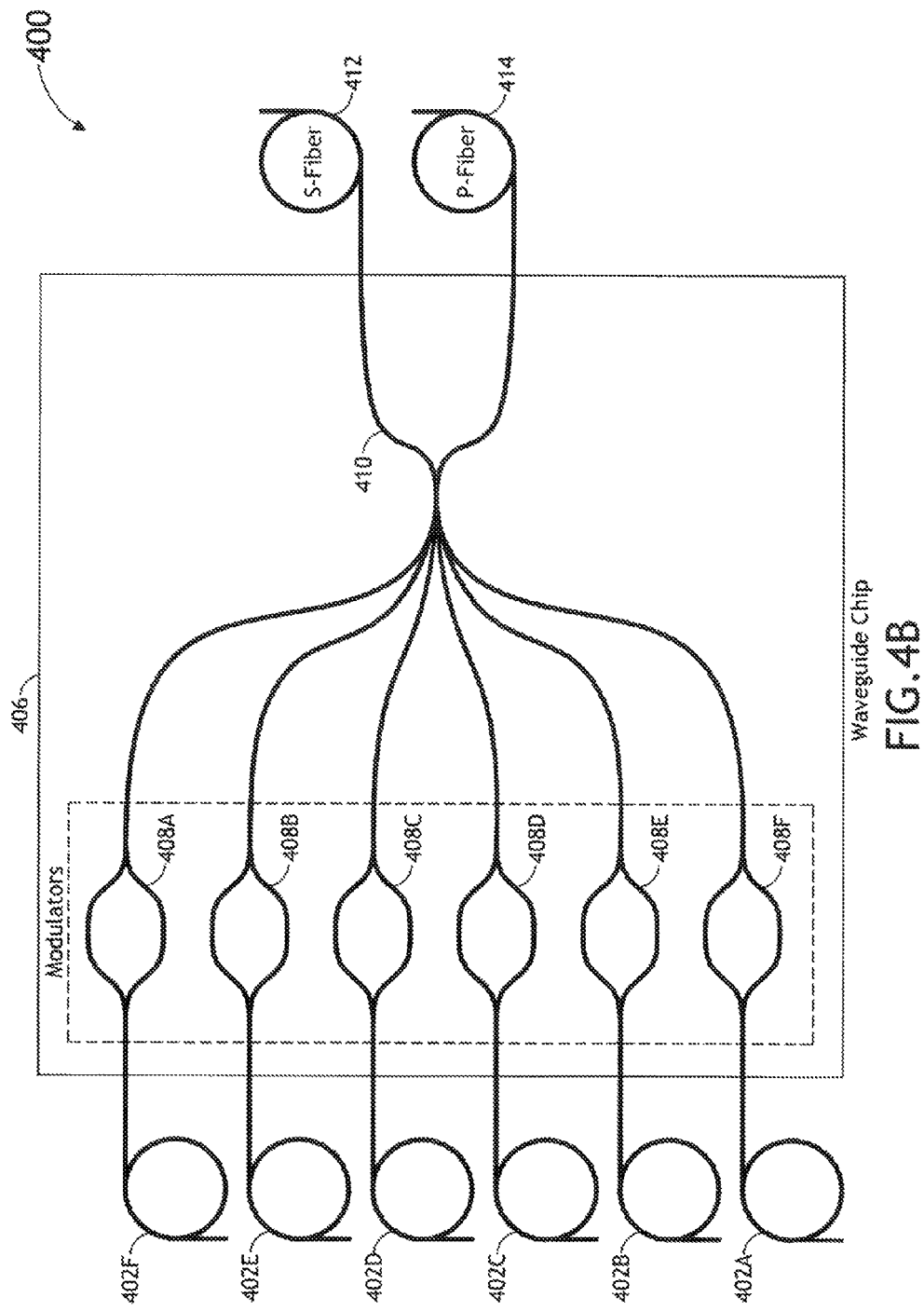
FIG. 4B is a block diagram illustrating an illumination system for providing illumination to a measurement head, in accordance with an embodiment of this disclosure.

FIGS. 4A and 4B illustrate another embodiment of a system 400 for providing illumination to a measurement head of an optical metrology system utilizing a plurality of illumination sources 402. Each illumination source 402 may be configured to transmit illumination at a selected wavelength along a corresponding optical fiber to a waveguide structure. In an embodiment, illustrated in FIG. 4A, the waveguide structure may include a plurality of cascaded fiber splitters 404. For example, illumination from six sources 402 may be combined through a waveguide structure including five 2×1 fiber splitters 404. Illumination may be attenuated as it travels through the beam splitters 404.

In an embodiment, the illumination sources 402 and beam splitters 404 may be arranged such that illumination at shorter wavelengths travels through fewer fiber splitters 404 than illumination at longer wavelengths. For example, illumination sources 402A and 402B may provide illumination at shorter wavelengths than illumination sources 402C and 402D. Similarly, illumination sources 402C and 402D may provide illumination at shorter wavelengths than illumination sources 402E and 402F.

In another embodiment, illustrated in FIG. 4B, the waveguide structure may include a planar lightwave circuit 406. Illumination at selected wavelengths may be transmitted from the plurality of illumination sources 402 over corresponding optical fibers to the lightwave circuit 406. The lightwave circuit 406 may include waveguides formed on a planar substrate. Since shapes of the waveguides formed on the substrate may be controlled more easily than the plurality of optical fibers, the lightwave circuit 406 may allow for a more compact device.

The lightwave circuit 406 may further include additional structures or devices for carrying out selected functions. In an exemplary embodiment, the lightwave circuit 406 may include intensity modulators 408 configured to control the intensity of illumination beams traveling through the lightwave circuit 406. In another exemplary embodiment, the lightwave circuit 406 may include a splitter 410 at the output of the waveguides formed on the substrate. The splitter 410 may be configured to direct portions of the illumination transmitted through the lightwave circuit 406 along single-mode optical fibers 412, 414 to polarization channels of the measurement head.

It is further noted that any description of an element or configuration pertaining to one of the foregoing systems 100, 200, 300, and 400 should be understood as applying to the other systems unless otherwise noted. Several of the concepts described herein may be applied modularly. For example, shutters 106, 206 may be included in any of the foregoing systems 100, 200, 300, and 400 to provide illumination at a selected wavelength by letting through illumination at the selected wavelength while blocking illumination at other wavelengths. Similarly, single-mode, multi-mode, and/or bifurcated optical fibers may be utilized to transfer illumination along an illumination path or delivery path to the measurement head in any of the foregoing systems 100, 200, 300, and 400. The foregoing examples illustrate how a component described in one embodiment can be modularly combined with components described in other embodiments. Furthermore, the ability to combine elements described herein will be readily apparent to those skilled in the art.

Any of the systems 100, 200, 300, and 400 may include means for controlling intensity of illumination at one or more selected wavelengths. In some embodiments, intensity of illumination delivered to the measurement head may be controlled utilizing an acousto-optic tunable filter (AOTF), as is at least partially described in US Pub. No. 2011/0310388 A1. US Pub. No. 2011/0310388 A1 is incorporated herein by reference.

In some embodiments, the AOTF may include a double pass arrangement, as described herein. Illumination from a plurality of optical fibers, each configured for transmitting illumination at a selected wavelength, may be focused onto the AOTF. RF modulation (e.g. amplitude and/or frequency modulation) of the AOTF may be utilized to determine how efficiently a particular order of illumination at selected wavelengths is diffracted. The diffracted beams of illumination may be collimated utilizing a collimation lens and retro-reflected off of a flat mirror. A reflected beam may be focused back onto the AOTF, diffracted again, and coupled back into its original optical fiber. A fiber optic circulator may be configured to split off the back-propagating illumination into an output optical fiber. This double pass arrangement may increase the dynamic range of the intensity control and reduce noise from frequency variations.

In some embodiments, each illumination source 102, 202, 302, 402 may be independently modulated to control illumination intensity at the one or more wavelengths. Accordingly, the number of photons incident on a detector array during integration time can be controlled to a selected level or within a selected margin for the plurality of illumination sources 102, 202, 302, 402. In some embodiments, each illumination source 102, 202, 302, 402 may be pulse width modulation (PWM) such that each pulse is shorter than integration time of the detector and is synchronized with the acquisition of each frame by the detector.

Any of the systems 100, 200, 300, and 400 may further include means for controlling spatial coherence of illumination at one or more selected wavelengths. Illumination at selected wavelengths provided by illumination sources 102, 202, 302, 402, such as lasers, through single-mode optical fibers may cause speckle patterns and other coherent artifacts because high spatial coherence may allow portions of illumination traveling along slightly different path lengths to interfere with each other.

In an embodiment, spatial coherence may be controlled by delivering illumination through a multi-mode fiber to the measurement head instead of utilizing a single-mode fiber. The multi-mode fiber may act like an extended object if different points on the fiber face are not correlated. An illumination source 102, 202, 302, 402 coupled into the multi-mode fiber typically excites a small subset of the modes of the multi-mode fiber. The illumination source 102, 202, 302, 402, may be configured to excite all or a broad distribution of the modes of the multi-mode fiber by scanning a focused illumination beam laterally across the fiber face in a random or pseudo-random pattern. A fold mirror mechanically coupled to a tip-tilt actuator or an alternative actuation means may be configured to scan the illumination beam across the fiber face. The illumination beam may be scanned at a sufficient speed to enable the time-varying mode structure to average out over the integration time of a detector, thereby resulting in behavior substantially equivalent or similar to that of an incoherent extended source. Alternatively, the modes may be randomly excited or scrambled utilizing an actuator mechanically coupled to the multi-mode fiber, such as, a voice coil, a MODAL EXPLORER SPECKLE SCRAMBLER by GIGA CONCEPT INC., or any other mode-scrambling actuator known to the art. For example, a voice coil may be configured to vibrate the multi-mode fiber to randomly mix the modes.

In another embodiment, spatial coherence may be controlled utilizing a rotating diffuser placed in the beam path of the measurement head. The rotating diffuser may be disposed near the output facet of an optical fiber delivering illumination to the measurement head or near an internal image plane. The diffuser may be configured to rotate such that a beam spot illuminates a plurality of different and/or random areas during integration time of the detector, thereby resulting in behavior substantially equivalent or similar to that of an incoherent extended source.

In another embodiment, spatial coherence may be controlled utilizing a fold mirror mechanically coupled to a tip-tilt actuator to scan illumination emanating from the measurement head laterally across a sample being analyzed. The spot locations scanned across the sample may be uncorrelated due to short correlation time of modulated illumination sources relative to time required to move a beam spot of illumination delivered to the sample surface. By measuring a sufficient plurality of spots across the sample, the measured data may exhibit few coherent artifacts.

FIGS. 5A through 5F illustrate a system 500 for providing illumination to a measurement head utilizing a true extended, spatially incoherent illumination source 502 to supply spatially incoherent illumination. Spatially incoherent illumination sources 502 include, but are not limited to, Xe arc sources, as discussed in U.S. Publication Nos. 2011/0026032 and 2010/0302521, and laser-sustained plasma (LSP) sources, as discussed in U.S. Pat. Nos. 7,435,982, 7,786,455, and 7,989,786, all incorporated herein by reference. In one embodiment, a high power infrared laser beam may be brought to a focus inside a bulb filled with a high pressure gas, such as Xe, to produce laser-sustained plasma. The laser may heat the gas. A high potential difference may be provided across a set of electrodes inside the bulb to ionize the heated gas, thereby creating plasma within the region of the focused laser beam. The plasma may provide intense illumination emission isotropically from the small region of the plasma, typically 100 um to 200 um in diameter. In some embodiments, the emitted illumination may be very broadband. For example, the plasma may produce significant emissions at wavelengths from about 150 nm to over 1000 nm. Filter mechanisms 504 may be configured to provide illumination at selected bands of wavelengths from the broadband spectrum of the illumination source 502. In the following embodiments, the broadband illumination source 502 is often a LSP source; however, any broadband illumination source 502 is contemplated such as, but not limited to, LSP sources, supercontinuum lasers, and any other broadband (i.e. white light) sources known to the art.

Figure 5A:
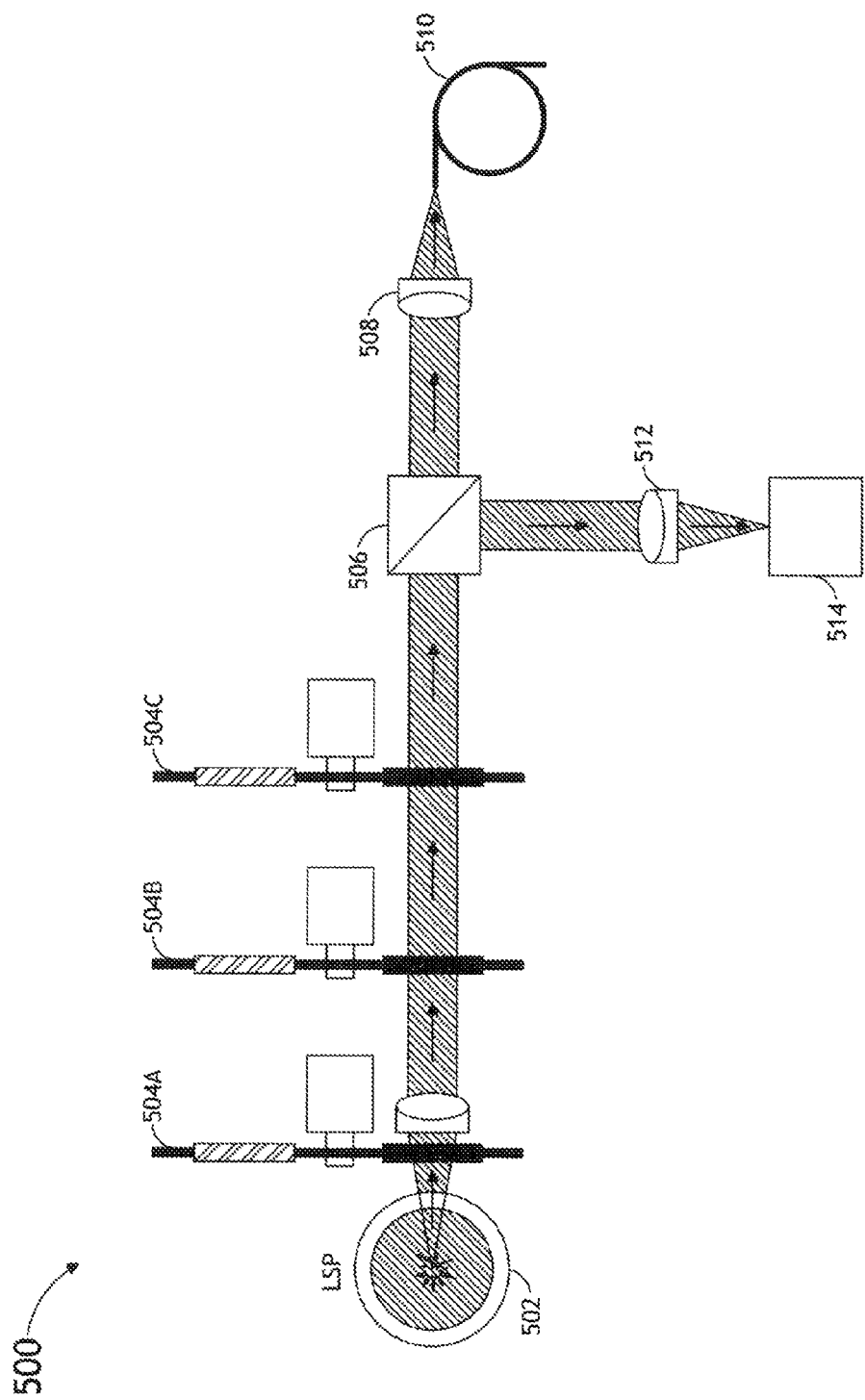
FIG. 5A is a block diagram illustrating an illumination system for providing illumination to a measurement head, in accordance with an embodiment of this disclosure.

FIG. 5A illustrates an embodiment of the system 500, where an LSP source 502 is configured to direct illumination along an illumination path the measurement head. One or more filter mechanisms 504 may be configured to filter broadband illumination from the LSP source 502 to provide illumination at a selected wavelength or a selected band of wavelengths to the measurement head. However, in some embodiments the filter mechanism 504 may be removed or configured to allow unfiltered illumination (i.e. white light) to be delivered to the measurement head. The system may further include a coupling lens 508 configured to direct illumination from the illumination path into at least one multi-mode fiber 510 for delivery to the measurement head. It is contemplated that a single-mode fiber may be utilized; however, coupling the image of the extended plasma spot into a single-mode fiber is less efficient than coupling into the multi-mode fiber 510. Furthermore, the small core of a single-mode fiber may make the illumination spatially coherent, thus defeating the purpose of utilizing an extended source 502.

In an embodiment, the filter mechanism 504 may include one or more thin film interference filters. Thin film filters may be capable of high efficiency narrow band filtering (e.g. >90%) and excellent rejection or attenuation of out-of-band illumination (e.g. <$10^{-6}$). In an embodiment, the filters 504 may be configured to filter illumination to provide bandwidths in the range of approximately 2 nm to 15 nm around the selected wavelength. The foregoing ranges are included for illustrative purposes only and should not be construed to limit the disclosure in any way.

The filter mechanisms 504 may include at least one high-pass filter 504A and/or low-pass filter 504B in addition to at least one narrowband filter 504C. The narrowband filter 504 may be configured to filter illumination from the LSP source 502 to provide illumination along the illumination path at a selected band of wavelengths. The high-pass filter 504A and/or low-pass filter 504B may be configured to reject or attenuate regions of the LSP source 502 spectrum that the narrowband filter 504C is unable to control, thereby filtering illumination to a range of wavelengths that the narrowband filter 504C is configured to control.

The filter mechanisms 504 may further include one or more actuators, such as motors, configured to translate or rotate a plurality of filters, where each filter may be configured for filtering one or more selected wavelengths or bands. In an embodiment, the plurality of filters may be coupled to a moveable mount allowing selection of filters to provide illumination at selected wavelengths over the course of a measurement. The moveable mount may include a motorized filter wheel; however, sliders and alternative actuators are contemplated. It is further contemplated that flexibility advantages may be realized with the use of fixed-wavelength interference filters. Filters may be supplied for selected wavelengths from commercial vendors with relative ease. Accordingly, filters may be customized for the system 500 to increase sensitivity and/or improve any other system attribute.

In an embodiment, the illumination path may include a beam splitter 506 configured to direct a portion of illumination along a detection path through a focusing lens 512 to a wavelength monitor 514. In some embodiments, the illumination path may further include one or more of the optical elements discussed above with regards to systems 100, 200, 300, and/or 400.

Figure 5B:
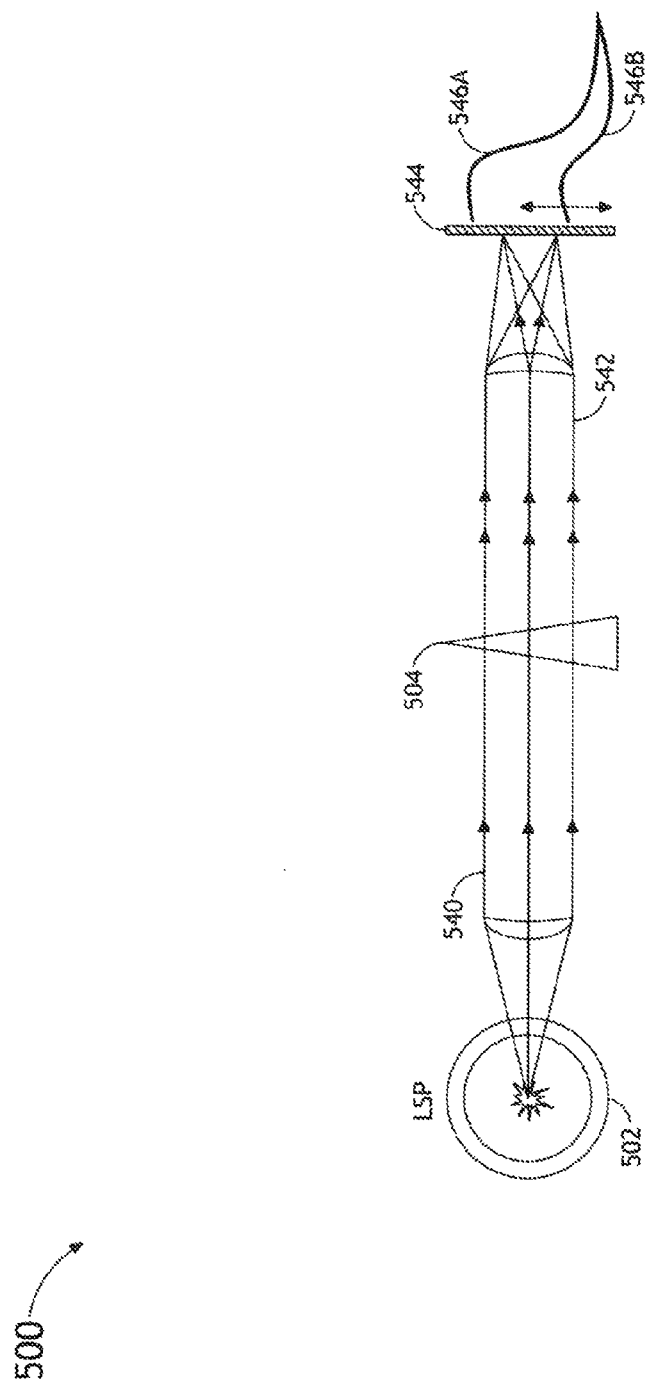
FIG. 5B is a block diagram illustrating an illumination system for providing illumination to a measurement head, in accordance with an embodiment of this disclosure.

In another embodiment, the filter mechanism 504 may include a monochromator arrangement allowing for illumination at a continuous range of selectable wavelengths to be provided along the illumination path. Monochromators are typically less efficient than fixed-wavelength interference filters due to the use of diffraction gratings as dispersive elements. Tuning monochromators with sufficient precision and accuracy may also present challenges and may require real-time wavelength monitoring. The typical monochromator arrangement tunes to a selected wavelength or band by rotating the dispersive element and keeping a fixed slit. However, FIG. 5B illustrates the system 500 including a modified monochromator arrangement. The system 500 may include a collimation lens 540 configured to provide illumination from the LSP source 502 along the illumination path. The filter mechanism 504 may include a dispersive element such as, but not limited to, a prism or diffraction grating. The dispersive element may be kept fixed while one or more optical fibers 546 are scanned over a spatially dispersed spectrum 544 of illumination so that illumination at a selected wavelength or band is coupled into at least one selected optical fiber 546. The spectrum 544 of illumination available for coupling into the optical fibers 546 may be determined by dispersion of the dispersive element and/or focal length of focusing optics 542 configured to couple illumination into the selected optical fiber 546. The bandwidth of illumination transmitted through an optical fiber 546 may be determined by the size of the fiber core and spatial separation of colors in the spectrum 544.

In an embodiment, one or more optical fibers 546 may be disposed in the plane of the spectrum 544. An optical fiber 546 may be translated along the spectrum 544 utilizing at least one actuator to vary the center wavelength of a selected band of illumination. The optical fiber 546 may be further translated in the direction perpendicular to the spectrum plane 544 to vary the bandwidth of illumination coupled into the optical fiber 546. It is further contemplated that an adjustable dispersive element may be configured to control bandwidth of illumination coupled into the optical fiber 546 by controlling dispersion of the illumination spectrum 544. In some embodiments, the illumination path may further include a spatial filter configured to provide narrow bands of illumination.

In another embodiment, the filter mechanism 504 may include at least one tunable interference filter. The tunable interference filter may be configured to shift a transmission band of illumination based on an incident angle of illumination on the filter. An actuator, such as a motorized rotation stage, may be mechanically coupled to the tunable interference filter. The actuator may be configured to tune to a selected wavelength or band by rotating the filter about an axis perpendicular to the direction of illumination received by the filter. Accordingly, illumination delivered along the illumination path can be continuously tuned without sacrificing the efficiency and/or stability advantages provided by interference filters.

In the previous embodiments, at least one optical fiber (e.g. multi-mode fiber) 510, 546 is configured to couple illumination delivered from the system 500 to the measurement head. Coupling to the measurement head via one or more optical fibers 510, 546 may be advantageous for packaging flexibility and/or system modularity. In other embodiments, however, it may be advantageous to couple the illumination from the system 500 directly to the measurement head without an optical fiber 510, 546. For example, coupling to the measurement head with an optical fiber 510, 546 may be highly inefficient due to mismatches between source etendue and fiber etendue. Furthermore, selected illumination wavelengths may be outside operation range of the optical fiber 510, 546. In an embodiment, illumination may be coupled directly to the measurement head by removing the coupling lens 508, 542 and optical fiber 510, 546 and delivering illumination along the illumination path directly to optics of the measurement head.

By utilizing an LSP source 502, the system 500 may be configured to provide illumination at selected wavelengths or wavelength bands outside the range available for diode lasers. Furthermore, thin film interference filters are readily available at wavelengths of 200 nm and below, thus the system 500 may be configured to provide illumination to the measurement head at selected UV wavelengths that may not be achieved utilizing diode lasers.

In some embodiments, the measurement head is configured for a normal incidence scatterometry system or another metrology system capable of making measurements with small beam spots. The small measurement spots tend to result in low etendue in the space of the analyzed sample. To improve illumination efficiency, the etendue of the LSP source 502 may be substantially matched to etendue of the measurement head of the metrology system. In a further embodiment, the one or more optical fibers 510, 546 utilized to couple illumination to the measurement head may have selected numerical aperture and/or selected core size based upon etendue of the LSP source 502 and/or the measurement head.

LSP sources 502 typically produce comparatively large beam spots which, when combined with the isotropic nature of the blackbody radiation from the hot plasma, results in large etendue. This is especially prevalent when a pump source 520, such as an infrared laser, configured for exciting the gas to produce plasma is not aligned with the axis of broadband illumination emitted from the plasma. An elongated beam spot may occur resulting in mismatched etendue and, thus, inefficient utilization of the LSP power. The following embodiments of the LSP source 502 are directed to alleviating the foregoing deficiencies by with greater radiant flux over with a smaller etendue.

Initially, a more powerful pump source 520 may be utilized to drive the LSP source 502. In one exemplary embodiment, the pump source 520 may include, but is not limited to, a laser having power of 8 kW or greater at 1070-1080 nm wavelengths. Utilizing a more powerful laser may increase etendue because the region where plasma emissions occur may be larger. The fill pressure and fill gas of the bulb or gas cell can also be selected to improve spectral radiance and etendue. In some embodiments, geometry of the pump beam and design of the focusing optics can also be used to control the etendue.

Figure 5C:
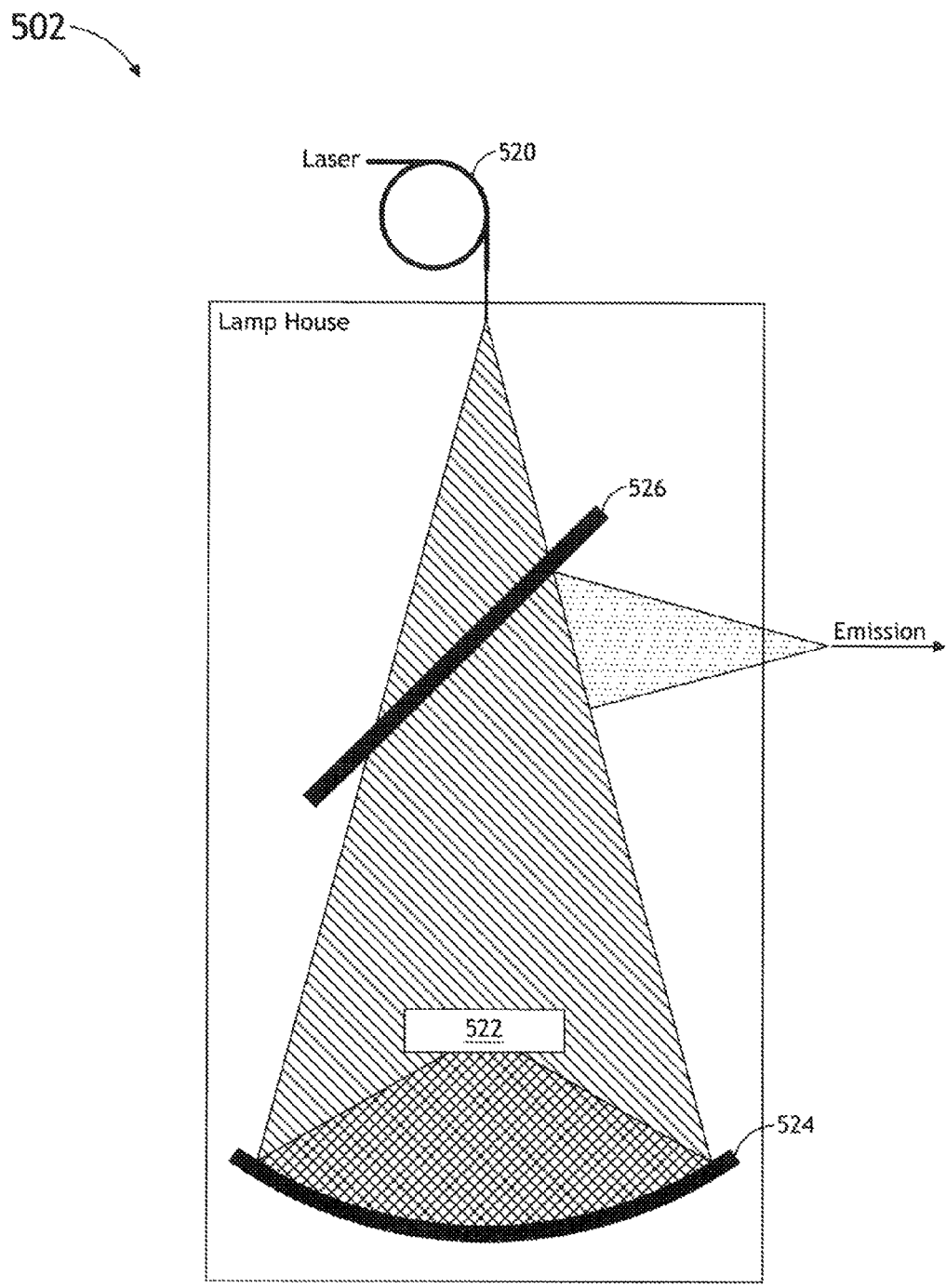
FIG. 5C is a block diagram illustrating a laser produced plasma source, in accordance with an embodiment of this disclosure.
Figure 5D:
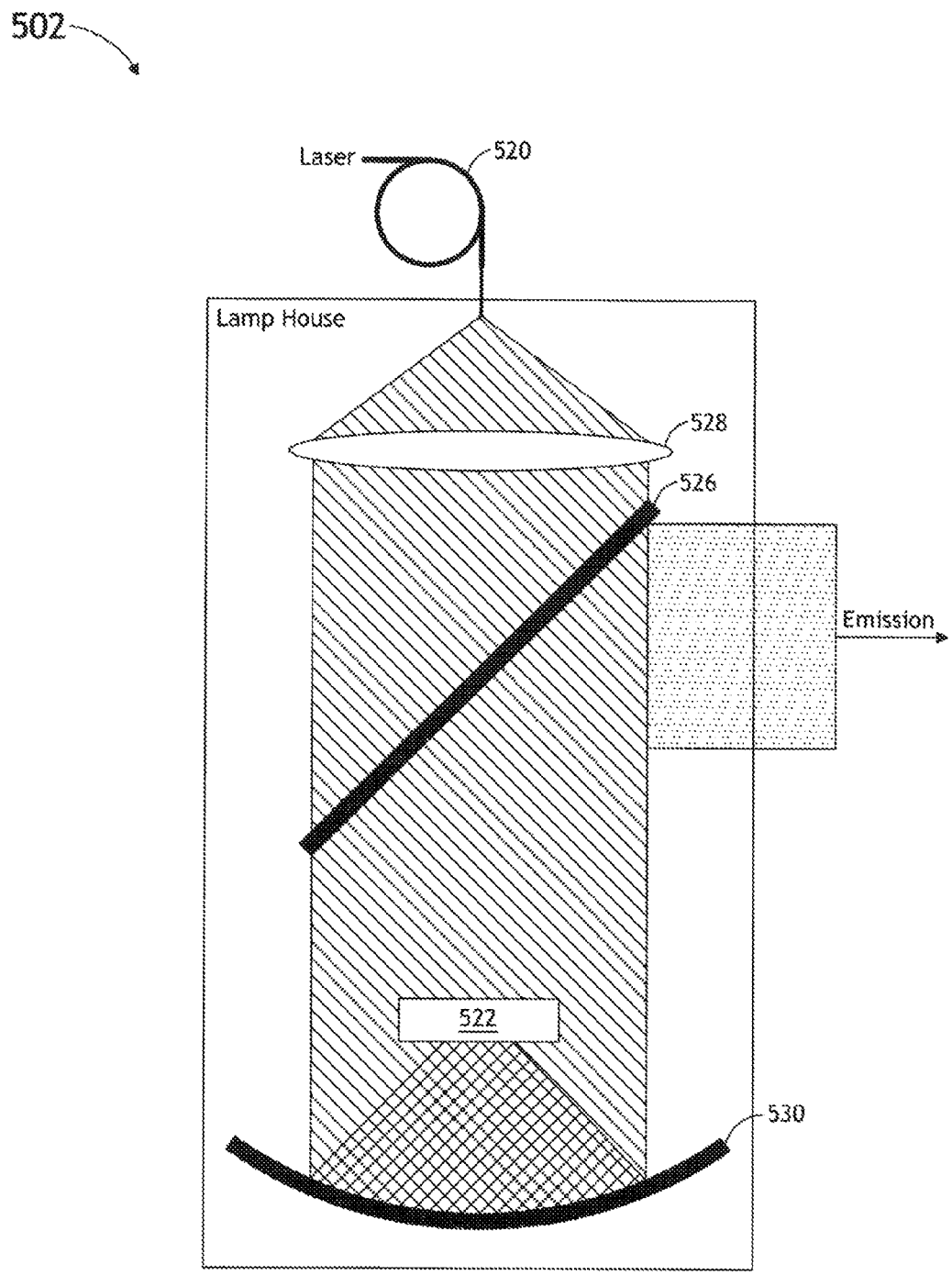
FIG. 5D is a block diagram illustrating a laser produced plasma source, in accordance with an embodiment of this disclosure.
Figure 5E:
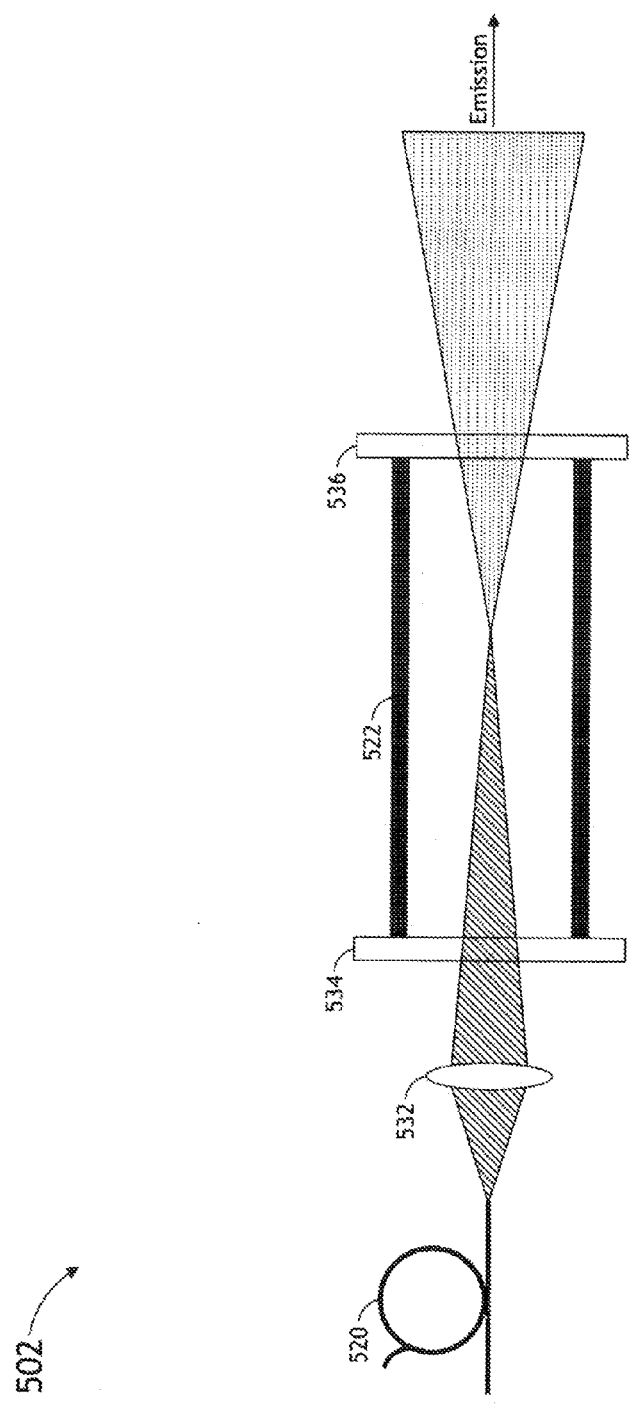
FIG. 5E is a block diagram illustrating a laser produced plasma source, in accordance with an embodiment of this disclosure.

Referring to FIGS. 5C through 5E, the pump beam emanating from the pump source 520 may be delivered along the same axis as the broadband illumination emitted from the plasma, thereby reducing elongation of the beam spot due to off-axis pumping. In an embodiment, the LSP source 502 may include a lamp house having a linear bench arrangement, as illustrated in FIG. 5C, where an optical fiber delivering the pump beam is disposed at one focus of an ellipsoidal mirror 524. The pump illumination may be transmitted through a cold mirror 526 and concentrated on the conjugate focus at a high numerical aperture, resulting in a small beam spot. A cell 522 containing pressurized gas configured to receive the pump illumination may be disposed at this focus. Broadband illumination emitted from the resulting plasma may be collected by the ellipsoidal mirror 524 and reflected off of the cold mirror 526 out of the lamp house along an emission path. In an embodiment, the lamp house may be a cylindrical structure. A cylindrical structure may have advantages over to a conventional lamp that is typically spherical in shape because aberrations in focusing the pump beam may be more easily controlled to achieve a tight beam spot.

FIG. 5D illustrates another embodiment of the LSP source 502 where the lamp house of the source includes a paraboloidal mirror 530 instead of the ellipsoidal mirror 524. The IR pump beam delivered from the pump source 520 may be collimated utilizing a collimation lens 528. The collimated illumination may be transmitted through the cold mirror 526 and focused onto the gas cell 522 utilizing the paraboloidal mirror 530. Broadband illumination emitted by the resulting plasma may be collected and re-collimated by the paraboloidal mirror 530. The collimated broadband illumination may be reflected out of the lamp house along the emission path by the cold mirror 526. Since the pump beam is collimated when it is directed through the cold mirror 526, aberrations may be avoided although some aberrations may be introduced when the pump illumination is directed at the gas cell 522. A small enough plasma beam spot may be necessary to avoid off-axis aberrations so that plasma imaging is not affected.

FIG. 5E illustrates another embodiment of the LSP source 502 where a first optical window 534 and a second optical window 536 are disposed parallel to one another at opposite ends of the gas cell 522. The pump beam may be focused from the pump source 520 through a focusing lens 532 into the first optical window 534 and resulting broadband illumination may be emitted from the second optical window 536 along the emission path. The second optical window may be coated with a film configured to block or attenuate the wavelength of the IR pump beam delivered from the pump source 520. The broadband illumination directed along the emission path may have spherical aberration. In some embodiments, the spherical aberration may be corrected through a collimator. The degree to which the aberration can be corrected may depend on the lateral size and NA (i.e. etendue) of the illumination and complexity of the collimator being used. However, in some instances, some (possibly insignificant) field-dependent aberration may still be present.

In an embodiment, the substrate material of the optical windows 534, 536 may be configured for high transmission from ultraviolet to infrared bands. The focusing optics may be well corrected and the optical window may include high optical quality materials enabling a diffraction-limited focus spot. In some embodiments, resulting illumination may be collected along the direction having the smallest spot size (i.e. along the chief ray for an on-axis field point).

Figure 5F:
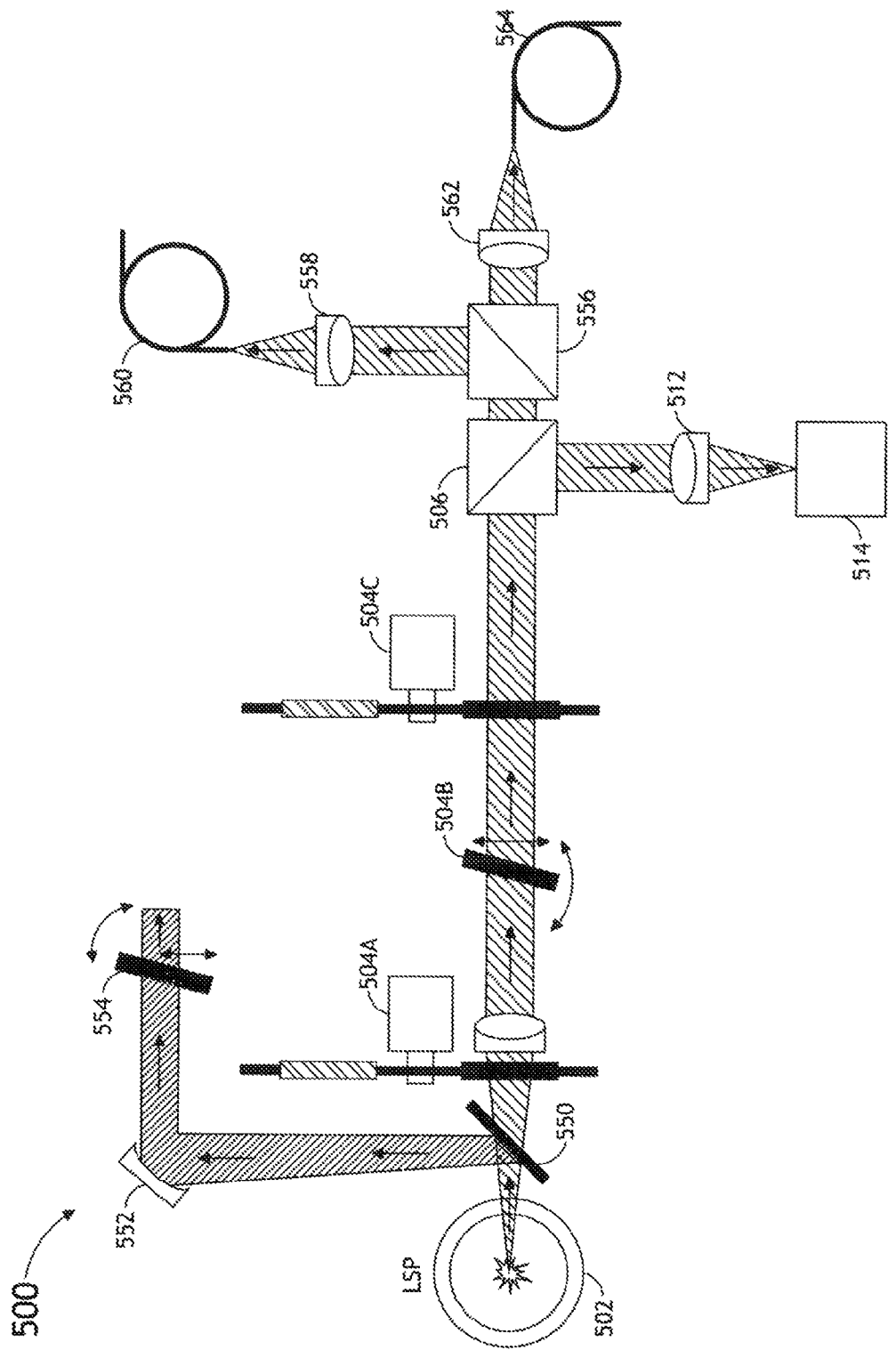
FIG. 5F is a block diagram illustrating an illumination system for providing illumination to a measurement head, in accordance with an embodiment of this disclosure.

FIG. 5F illustrates an exemplary embodiment of the system 500 configured to provide illumination at VIS and IR wavelengths along delivery paths to at least two polarization channels of the measurement head with an optional delivery path for illumination at DUV wavelengths. The LSP source 502 may be configured to provide broadband illumination through high-pass and short-pass filters 504A and 504C rotated into place for operation in the VIS and IR bands. A tunable filter 504B may be configured to slide into place on a linear slide to filter illumination to a selected wavelength or a selected band of wavelengths. A polarizing beam splitter 556 may be configured to direct illumination from the illumination path at orthogonal polarizations along corresponding delivery paths to the measurement head. In an embodiment, each delivery path may include a coupling lens 558, 562 configured to direct illumination along an optical fiber 560, 564 to a polarization channel of the measurement head. The optical fibers 560, 564 may have selected numerical aperture based upon etendue of the LSP source 502 and/or the measurement head.

The LSP source 502 may be further configured to provide illumination in the DUV band (e.g. <400 nm) along a DUV delivery path utilizing dichroic beam splitter 550. The DUV delivery path may include a paraboloidal mirror 552 configured to collimate illumination along the DUV delivery path. A tunable filter 554 may be configured to allow illumination at a selected wavelength or band in the DUV spectrum to be delivered directly to the measurement head. In another embodiment, the dichroic beam splitter 550 may be swapped with a broadband high reflective mirror configured to direct UV, VIS, and IR illumination along the free space DUV delivery path to obtain an illumination source configured for extremely broadband spectroscopy.

In an embodiment, the illumination path may further include a beam splitter 506 configured to direct a small portion of illumination along a monitoring path through a focusing lens 512 to a wavelength monitor 514. In another embodiment, the filters 504 may be removable or configured to allow broadband illumination along the illumination path for a broadband VIS-IR source configured for spectroscopic reflectometry.

FIG. 5G illustrates yet another embodiment of system 500, wherein illumination emanating from the LSP source 502 is filtered utilizing a plurality of dichroic beam splitters 570. Each of the dichroic beam splitters 570 may be configured to direct illumination having a selected range of wavelengths along a respective delivery path. One or more filters 572 may be disposed in each delivery path to allow further tuning to a selected wavelength or range of wavelengths. Each delivery path may further include at least one shutter 574, where the plurality of shutters 574 across the plurality of delivery paths may be configured to allow or block illumination so that illumination from a selected delivery path is passed while others are blocked. A plurality of beam combiners 576 may be configured to receive illumination from the delivery paths and direct the illumination along a common guidance path to a measurement head. In some embodiments, the guidance path may further include a beam splitter 578 configured to direct a first portion of the illumination along a monitoring path to a wavelength monitor 514 and at least a second portion of the illumination along an illumination path to the measurement head. Optical paths going to the wavelength monitor and/or the measurement head may be further delineated by one or more optical elements, such as coupling lenses 512 and 508, optical fibers 510, and the like.

Filtering out multiple wavelength ranges of the LSP source 502 and employing shutters 574 for selection may enable faster switching speed. In some embodiments, the filters 572 may be preset to selected values so that only the shutters 574 are actuated during measurement. Optical elements, such as focusing lenses, may be further utilized to enable smaller (hence faster) shutters 574 for switching. In a further embodiment, a calibration source, such as an atomic source with a number of well-known lines (e.g. HgAr source), may be combined with the LSP source 502 output utilizing an integrating sphere, and then directed to a measuring spectrometer, thereby further mitigating speckle.

According to various embodiments, system 500 is configured to provide illumination at ultraviolet wavelengths. To do so, one or more components of the LSP source 502 may include reflective optics. In some embodiments, a majority of the optics in the LSP source 502 are reflective optics. In some embodiments, an optical fiber is configured to deliver illumination to the measurement head for selected wavelengths (e.g. down to ~240 nm). However, wavelengths falling below a selected threshold may be delivered by direct coupling (i.e. by a free space beam) to achieve sufficient performance.

In some embodiments, one or more of the foregoing systems may further include a means for controlling temperature to stabilize one or more of the laser sources, wavelength monitor, and fiber coupling of a respective system. For example, a heating and/or cooling element may be disposed along the illumination path or in proximity of one or more locations along the illumination path.

In some embodiments, one or more of the foregoing systems may further include a means for apodizing illumination to generate a spot with small sidelobes at the wafer plane. For example, a variable transmission coating or another apodizing layer may be disposed upon a fiber tip or at another illumination output.

In an embodiment, one of systems 100, 200, 300, or 400 may be combined with system 500 to gain certain advantages of each system. For example, a combined system may allow for brightness and switching speed attributable to systems 100, 200, 300, and 400 for a selection of wavelengths in addition to the ability to access UV wavelengths in accordance with system 500. There may also be certain coherence advantages attributable to one or more of the systems described herein. In the combined system, single-mode fibers may be used for the plurality of single-wavelength sources while one or more multi-mode fibers are used for the broadband source. In some embodiments, however, one or more multi-mode fibers may be used for both types of illumination sources. An actuator may be configured to scramble the fiber modes to reduce laser speckle, as previously discussed herein.

It is contemplated that any portion of an above-described embodiment may be combined with any portion of at least one other above-described embodiment to achieve various implementational goals (e.g. selectable wavelength, controlled coherence, controlled intensity, controlled polarization, etendue matching, switching speed, delivery efficiency, and the like). Accordingly, the embodiments herein should be interpreted as being illustrative of the various aspects of this disclosure and not in any way limiting.

Those having skill in the art will further appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. Program instructions implementing any of the steps described herein may be transmitted over or stored on carrier medium and executed by one or more processors. In some embodiments, the carrier medium may be a transmission medium such as a wire, cable, or wireless transmission link. In some embodiments, the carrier medium may include a storage medium such as a read-only memory, a random access memory, a magnetic or optical disk, or a magnetic tape.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A system for providing illumination to a measurement head, comprising:
    a plurality of illumination sources including a first illumination source, a second illumination source, a third illumination source, a fourth illumination source, a fifth illumination source, and a sixth illumination source;
    a first fold mirror configured to reflect illumination from the first illumination source along a guidance path;
    a second fold mirror configured to reflect illumination from the second illumination source along the guidance path;
    a first dichroic combiner configured to transmit illumination from the first illumination source along the guidance path, the first dichroic combiner further configured to reflect illumination from the third illumination source along the guidance path;
    a second dichroic combiner configured to transmit illumination from the second illumination source along the guidance path, the second dichroic combiner further configured to reflect illumination from the fourth illumination source along the guidance path;
    a third dichroic combiner configured to transmit illumination from the first illumination source and illumination from the third illumination source along the guidance path, the third dichroic combiner further configured to reflect illumination from the fifth illumination source along the guidance path;
    a fourth dichroic combiner configured to transmit illumination from the sixth illumination source along the guidance path; the fourth dichroic combiner further configured to reflect illumination from the second illumination source and illumination from the fourth illumination source along the guidance path; and
    a fifth dichroic combiner configured to transmit illumination from the second illumination source, illumination from the fourth illumination source, and illumination from the sixth illumination source along an illumination path to a measurement head, the fifth dichroic combiner further configured to reflect illumination from the first illumination source, illumination from the third illumination source, and illumination from the fifth illumination source along the illumination path to the measurement head.

2. The system of claim 1, wherein the system further includes:
    a plurality of shutters, each shutter configured to receive illumination from an illumination source of the plurality of illumination sources, the plurality of shutters configured to allow illumination at a selected wavelength to be delivered along the illumination path.

3. The system of claim 1, wherein each illumination source of the plurality of illumination sources is configured to provide illumination at a selected wavelength.

4. The system of claim 1, wherein each illumination source of the plurality of illumination sources is configured to provide illumination at a selected intensity.

5. The system of claim 4, wherein the selected intensity of each illumination source is controlled by pulse width modulation.

6. The system of claim 4, wherein the selected intensity of each illumination source is controlled utilizing an acousto-optic filter.

7. The system of claim 1, wherein the illumination path includes one or more optical elements configured to separate illumination into orthogonal polarization components.

8. The system of claim 1, wherein the system further includes:
a wavelength monitor configured to receive a portion of illumination from the illumination path.

9. The system of claim 1, wherein the illumination path includes one or more single-mode optical fibers configured to deliver illumination to the measurement head.

10. The system of claim 1, wherein the illumination path includes one or more multi-mode optical fibers configured to deliver illumination to the measurement head.

11. The system of claim 10, wherein the illumination path further includes:
a coupling lens configured to focus illumination;
a fold mirror configured to receive focused illumination from the coupling lens; and
an actuator coupled to the fold mirror, the actuator configured for actuating the fold mirror to scan focused illumination across at least one core of the one or more multi-mode fibers.

12. The system of claim 10, wherein the illumination path further includes:
a coupling lens configured to focus illumination delivered to the one or more multi-mode fibers; and
an actuator coupled to a tip of the one or more multi-mode fibers, the actuator configured for actuating the tip of the one or more multi-mode fibers so that focused illumination is scanned across at least one core of the one or more multi-mode fibers.

13. The system of claim 10, wherein the illumination path further includes:
an actuator configured to vibrate the one or more multi-mode fibers.

14. The system of claim 1, wherein at least one of the plurality of illumination sources is a supercontinuum laser.

15. A system for providing illumination to a measurement head, comprising:
a plurality of illumination sources including a first illumination source, a second illumination source, a third illumination source, a fourth illumination source, a fifth illumination source, and a sixth illumination source;
a first dichroic combiner configured to transmit illumination from the first illumination source along a guidance path, the first dichroic combiner further configured to reflect illumination from the second illumination source along the guidance path;
a second dichroic combiner configured to transmit illumination from the third illumination source along the guidance path, the second dichroic combiner further configured to reflect illumination from the first illumination source and illumination from the second illumination source along the guidance path;
a third dichroic combiner configured to transmit illumination from the fourth illumination source along the guidance path, the third dichroic combiner further configured to reflect illumination from the fifth illumination source along the guidance path;
a fourth dichroic combiner configured to transmit illumination from the fourth illumination source and illumination from the fifth illumination source along an illumination path to a measurement head, the fourth dichroic combiner further configured to reflect illumination from the first illumination source, illumination from the second illumination source, and illumination from the third illumination source along the illumination path to the measurement head; and
a beam splitter configured to direct illumination from the sixth illumination source along the illumination path to the measurement head.

16. The system of claim 15, wherein the system further includes:
a plurality of shutters, each shutter configured to receive illumination from an illumination source of the plurality of illumination sources, the plurality of shutters configured to allow illumination at a selected wavelength to be delivered along the illumination path.

17. The system of claim 15, wherein each illumination source of the plurality of illumination sources is configured to provide illumination at a selected wavelength.

18. The system of claim 15, wherein each illumination source of the plurality of illumination sources is configured to provide illumination at a selected intensity.

19. The system of claim 18, wherein the selected intensity of each illumination source is controlled by pulse width modulation.

20. The system of claim 18, wherein the selected intensity of each illumination source is controlled utilizing an acousto-optic filter.

21. The system of claim 15, wherein the illumination path includes one or more optical elements configured to separate illumination into orthogonal polarization components.

22. The system of claim 15, wherein the system further includes:
a wavelength monitor configured to receive a portion of illumination from the illumination path.

23. The system of claim 15, wherein the illumination path includes one or more single-mode optical fibers configured to deliver illumination to the measurement head.

24. The system of claim 15, wherein the illumination path includes one or more multi-mode optical fibers configured to deliver illumination to the measurement head.

25. The system of claim 24, wherein the illumination path further includes:
a coupling lens configured to focus illumination;
a fold mirror configured to receive focused illumination from the coupling lens; and
an actuator coupled to the fold mirror, the actuator configured for actuating the fold mirror to scan focused illumination across at least one core of the one or more multi-mode fibers.

26. The system of claim 24, wherein the illumination path further includes:
a coupling lens configured to focus illumination delivered to the one or more multi-mode fibers; and
an actuator coupled to a tip of the one or more multi-mode fibers, the actuator configured for actuating the tip of the one or more multi-mode fibers so that focused illumination is scanned across at least one core of the one or more multi-mode fibers.

27. The system of claim 24, wherein the illumination path further includes:
an actuator configured to vibrate the one or more multi-mode fibers.

28. The system of claim 15, wherein at least one of the plurality of illumination sources is a supercontinuum laser.

29. A system for providing illumination to a measurement head, comprising:
a plurality of illumination sources configured to provide illumination at a plurality of wavelengths along a plurality of optical fibers, each optical fiber configured to receive illumination at a different wavelength;

a coupling lens configured to receive illumination at a selected wavelength from a selected optical fiber of the plurality of optical fibers, the coupling lens further configured to direct illumination at the selected wavelength along a delivery optical fiber;

a ferrule configured to hold the plurality of optical fibers;

an actuator mechanically coupled to at least one of the ferrule, the coupling lens, and the delivery optical fiber, the actuator configured to align the selected optical fiber with at least one of the coupling lens and the delivery optical fiber; and a collimation lens configured receive illumination at the selected wavelength from the delivery optical fiber, the collimation lens further configured to direct illumination at the selected wavelength along an illumination path to a measurement head.

30. The system of claim 29, wherein each illumination source of the plurality of illumination sources is configured to provide illumination at a selected intensity.

31. The system of claim 30, wherein the selected intensity of each illumination source is controlled by pulse width modulation.

32. The system of claim 30, wherein the selected intensity of each illumination source is controlled utilizing an acousto-optic filter.

33. The system of claim 29, wherein the illumination path includes one or more optical elements configured to separate illumination into orthogonal polarization components.

34. The system of claim 29, wherein the system further includes:

a wavelength monitor configured to receive a portion of illumination from the illumination path.

35. The system of claim 29, wherein the illumination path includes one or more single-mode optical fibers configured to deliver illumination to the measurement head.

36. The system of claim 29, wherein the illumination path includes one or more multi-mode optical fibers configured to deliver illumination to the measurement head.

37. The system of claim 36, wherein the illumination path further includes:

a coupling lens configured to focus illumination;

a fold mirror configured to receive focused illumination from the coupling lens; and an actuator coupled to the fold mirror, the actuator configured for actuating the fold mirror to scan focused illumination across at least one core of the one or more multi-mode fibers.

38. The system of claim 36, wherein the illumination path further includes:

a coupling lens configured to focus illumination delivered to the one or more multi-mode fibers; and an actuator coupled to a tip of the one or more multi-mode fibers, the actuator configured for actuating the tip of the one or more multi-mode fibers so that focused illumination is scanned across at least one core of the one or more multi-mode fibers.

39. The system of claim 36, wherein the illumination path further includes:

an actuator configured to vibrate the one or more multi-mode fibers.

40. The system of claim 29, wherein at least one of the plurality of illumination sources is a supercontinuum laser.

41. A system for providing illumination to a measurement head, comprising:

a plurality of illumination sources configured to provide illumination at a plurality of wavelengths along a plurality of optical fibers, each optical fiber configured to receive illumination at a different wavelength;

a waveguide structure configured to direct illumination from the plurality of optical fibers along an illumination path to a measurement head, wherein the waveguide structure includes a plurality of optical fiber splitters for combining light from the plurality of illumination sources, wherein a particular optical fiber splitter combines illumination from a first illumination source and a second illumination source; and a plurality of shutters disposed between the plurality of illumination sources and the waveguide structure, the plurality of shutters configured to allow illumination at a selected wavelength to be delivered along the illumination path.

42. The system of claim 41, wherein the one or more optical splitters include a plurality of cascaded single-mode optical fiber splitters.

43. The system of claim 42, wherein the illumination path includes a bifurcated optical fiber configured to direct a portion of illumination to each polarization channel of the measurement head.

44. The system of claim 41, wherein the waveguide structure includes a planar lightwave circuit.

45. The system of claim 44, wherein the planar lightwave circuit includes a plurality of intensity modulators configured to control intensity of illumination received from each illumination source.

46. The system of claim 44, wherein the system further includes single-mode fibers configured to deliver illumination to polarization channels of the measurement head, wherein the planar lightwave circuit includes a splitter configured to direct a portion of illumination along each of the single-mode optical fibers to each of the polarization channels of the measurement head.

47. The system of claim 38, wherein at least one of the plurality of illumination sources is a supercontinuum laser.

48. A system for providing illumination to a measurement head, comprising:

one or more illumination sources including at least one of a broadband illumination source and a plurality of laser sources;

a wavelength selection mechanism including at least one of a tunable filter, a plurality of shutters, a ferrule, and a plurality of waveguide modulators, the wavelength selection mechanism configured receive illumination from the one or more illumination sources, the wavelength selection mechanism further configured to direct at least a portion of received illumination having a selected wavelength along an illumination path;

an intensity controller including at least one of a pulse width modulator, an acousto-optic filter, and a waveguide intensity modulator, the intensity controller configured to control intensity of the portion of illumination delivered along the illumination path; and a coherence controller including at least one of an optical fiber actuator, a fold mirror actuator, and an incoherent illumination source, the coherence controller configured to decrease speckle in the portion of illumination delivered along the illumination path.

49. The system of claim 48, wherein the one or more illumination sources include a broadband source and a plurality of laser sources.

50. The system of claim 48, wherein at least one of the plurality of laser sources is a supercontinuum laser.

* * * * *